United States Patent [19]
Weiner et al.

[11] Patent Number: 6,041,331
[45] Date of Patent: Mar. 21, 2000

[54] AUTOMATIC EXTRACTION AND GRAPHIC VISUALIZATION SYSTEM AND METHOD

[75] Inventors: Michael L. Weiner, Webster, N.Y.;
John Jacob Kolb V, Rowley, Mass.;
Todd Chronis, Rochester, N.Y.

[73] Assignee: Manning and Napier Information Services, LLC, Rochester, N.Y.

[21] Appl. No.: 08/989,832

[22] Filed: Dec. 12, 1997

Related U.S. Application Data

[60] Provisional application No. 60/042,295, Apr. 1, 1997.

[51] Int. Cl.[7] .................................................. G06F 11/00
[52] U.S. Cl. ............................................................ 707/103
[58] Field of Search .......................................... 707/1–224

[56] References Cited

U.S. PATENT DOCUMENTS

| | | | |
|---|---|---|---|
| 5,515,488 | 5/1996 | Hoppe et al. | 345/440 |
| 5,546,529 | 8/1996 | Bowers et al. | 345/348 |
| 5,692,176 | 11/1997 | Holt et al. | 707/5 |
| 5,706,502 | 1/1998 | Foley et al. | 395/610 |
| 5,721,897 | 2/1998 | Rubinstein | 707/2 |
| 5,748,186 | 5/1998 | Raman | 345/302 |
| 5,761,497 | 6/1998 | Holt et al. | 707/5 |
| 5,761,656 | 6/1998 | Ben-Shachar | 707/4 |
| 5,794,233 | 8/1998 | Rubinstein | 707/4 |

OTHER PUBLICATIONS

U.S. application No. 08/929,603, Snyder, filed Sep. 15, 1997.

*Primary Examiner*—Thomas G. Black
*Assistant Examiner*—John Gladstone Mills, III
*Attorney, Agent, or Firm*—Townsend and Townsend and Crew LLP

[57] ABSTRACT

According to the present invention, a method for extracting information from a plurality of documents for display. Information is extracted from a set of documents according to a set of pre-defined categories. A visual representation of the extracted information is provided to a user, who can apply one or more filters to the information in order to produce for display a visual representation of information content in the filtered information.

11 Claims, 10 Drawing Sheets

(step 208 of Fig. 2A)

(step 228 of Fig. 2B)

![The AFCEA Information Alert - Netscape screen, showing query panel with "I would like information about factors affecting technology exports including controls, restraints, or sanctions." and categorized result panels]

405 — window

- Query: I would like information about factors affecting technology exports including controls, restraints, or sanctions.
- Configure: Change View
- Tips: This folder categorizes document information by topic. The topic categories displayed are based on the results of the selected query.

Tabs: Queries / New Query / Results / Filter / Visualizer / Documents

Organization (general)(1/24) — 402
- Heritage Foundation (1)

Country (14/49) — 404
- United States (4)
- China (4)
- Iran (2)
- Russia (1)

Subject Areas (5/27) — 414
- ✓ United States (4)
- ✓ Asia (4)
- ✓ Commerce/Trade (4)
- Govt. Officials/Citizens (3)

Person (31/115) — 406, 408
- ✓ Jiang Zemin (4)
- Bill Clinton (2)
- Clinton (1)
- Benjamin Gilman (1)

| Sum | Full | Rank | Headlines |
|---|---|---|---|
| 📄 | 📄 | 7. | Nuclear sales to China too chancy, foes insist. |
| 📄 | 📄 | 10. | U.S.-CHINA PACT MAY OPEN DOOR TO NUKE REACTOR SALES BEIJING PLRDGES TO END AID TO IRAN |

416   418

Document: Done

Fig. 4C

AUTOMATIC EXTRACTION AND GRAPHIC VISUALIZATION SYSTEM AND METHOD

CROSS REFERENCE TO RELATED APPLICATIONS

This application claims priority from the following U.S. Provisional Application, the disclosure of which, including all appendices and all attached documents, is incorporated by reference in its entirety for all purposes:

U.S. Provisional Patent Application No. 60/042,295, Michael L. Weiner and John J. Kolb V., entitled, "Method and Apparatus for Automatic Extraction and Graphic Visualization of Textual Information", filed Apr. 1, 1997.

Further, this application incorporates by reference the following U.S. Patent Applications in their entirety for all purposes:

U.S. Provisional Patent Application No. 60/028,437, David L. Snyder and Randall J. Calistri-Yeh, entitled, "Management and Analysis of Patent Information Text (MAPIT)", filed Oct. 15, 1996; and U.S. patent application Ser. No. 08/929,603, David L. Snyder and Randall J. Calistri-Yeh, entitled, "Management and Analysis of Document Information Text", (attorney docket no. 17965-000110), filed Sep. 15, 1997.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

PAPER APPENDIX

The following paper appendices are included herewith and incorporated by reference in their entirety for all purposes:

Appendix A: Source code listing of process visual.htm in an embodiment of the invention comprising nineteen (19) sheets;

Appendix B: Source code listing of process f.htm in an embodiment of the invention comprising one (1) sheet;

Appendix C: Source code listing of process h.htm in an embodiment of the invention comprising one (1) sheet;

Appendix D: Source code listing of process hotsite.htm in an embodiment of the invention comprising three (3) sheets;

Appendix E: Source code listing of process margins_v.htm in an embodiment of the invention comprising two (2) sheets;

Appendix F: Source code listing of process tabs.htm in an embodiment of the invention comprising two (2) sheets.

BACKGROUND OF THE INVENTION

The present invention relates to systems for analyzing and managing information and, more particularly to a method and apparatus for interactively retrieving, visualizing and navigating through textual information extracted from multiple documents by a search engine.

We live in the information age. How prophetic the statement of a major computer manufacturer which said "It was supposed to be the atomic age, instead it has turned out to be the information age." Prophetic both in the impact of the age, as well as its potential for beneficial and deleterious effects on humankind. Faced with an explosion of information fueled by the burgeoning technologies of networking, inter-networking, computing and the trends of globalization and decentralization of power, today's business manager, technical professional and investment manager are faced with the need for careful, accurate and timely analysis of the deluge of information underlying their everyday decisions.

Several factors underlie this need for prompt information analysis. First, in an era of ever tighter cost controls and budgetary constraints, companies are faced with a need to increase their operational efficiency. In doing so, they face the need to assimilate large amounts of news, memos and other information, both concerning their internal functioning as well as their position in the marketplace. Second, the omnipresent factor of litigation which may cost or earn a company billions of dollars. The outcome of such contests is often determined by which side has access to the most accurate information. Third, the drive for greater economies of scale and cost efficiencies spurs mergers and acquisitions, especially in high technology areas. The success of such activity is highly dependent upon who has superior abilities to assimilate information. Fourth, the explosive growth of technology in all areas, especially in biotechnology, computing and finance, brings with it the need to access and comprehend technical trends impacting the individual firm. Fifth, the globalization of the market place in which today's business entities find themselves brings with it the need to master information concerning a multiplicity of market mechanisms in a multiplicity of native languages and legal systems. Sixth, the decentralization of large industrial giants has led to the need for greater cross-licensing of indigenous technologies. This requires that companies discern precisely the quantity and kinds of technology being cross-licensed.

Faced with the increasing importance of successful analysis of a burgeoning information stockpile, today's business professional is faced, as never before, with a need for tools which not only find information, but find the correct information, as well as, assist the user in drawing conclusions and perceiving the meaning behind the information resources discovered.

The most typical information analysis tool available today is a database of text or images which is searched by a rudimentary search engine. The user enters a search query consisting of specific key words encoded in a boolean formalism. Often the notation is so complex that trained librarians are needed to ensure that the formula is correct. The results of database searches are a list of documents containing the key words the user has requested. The user often does not know the closeness of the match until each reference cited by the search engine is studied manually. There is often no way to search different portions of documents. Finally, the output of this process is a flat amalgam of documents which has not been analyzed or understood by the system performing the search.

The user who turns to an automated information analysis system is seeking not merely a collection of related documents, but the answers to critical questions. For example, "Of the court cases decided in California last year, how many of them involved a sexual harassment charge?"

"What companies exist as potential competitors in the market place for our planned product?"

Current analysis tools demonstrate themselves to be ineffective when faced with these types of issues. This issue was addressed in the above commonly owned, copending U.S. patent application Ser. No. 08/929,603, David L. Snyder and Randall J. Calistri-Yeh, entitled, "Management and Analysis of Document Information Text", (attorney docket no. 17965-000110), filed Sep. 15, 1997, which described an advanced search technique for graphing information in a set of documents. However, an environment for interactively visualizing relationships among the information in documents by selectively filtering and graphically displaying data of the present invention are heretofore not known in the art.

For the foregoing reasons, what is needed is an information analysis tool capable of parsing information from a large set of documents into manageable information units and presenting these information units to users in an intelligible way.

SUMMARY OF THE INVENTION

The present invention provides a method for extracting information from a plurality of documents according to a set of pre-defined categories, upon which a graphical representation of the extracted information is provided, enabling users to visualize relationships among the information in the documents by applying a succession of filters and viewing a graphical representation of the results. This invention may be implemented in conjunction with an information engine, serving as an interface to the information engine. However, an information engine is not essential to the invention.

Specifically, according to the invention units of information are extracted from documents according to a set of pre-defined categories, and thereupon a visual representation of the extracted units of information is provided to the user; thereupon, the user may apply individual instances of filters to the information units to produce a filtered set of information units forming for display a revised visual representation of the filtered set of information units comprised exclusively of only those documents of the original document set containing each of the information units in the filtered set of information units.

The present invention provides an easy to understand human perceptible representation of information objects contained within documents. In select embodiments the representation may have a visual form, such as a bar chart, a pie chart, a color intensity scheme or other indicia of a degree of presence of information objects. Further, information is grouped according to a set of pre-defined categories, which provides the user with visual indication of relationships between the information in various documents. The present invention is especially useful in a role such as an interface to a search engine.

The invention will be better understood upon reference to the following detailed description in connection with the accompanying drawings.

BRIEF DESCRIPTION OF THE DRAWINGS

FIGS. 4A–4D depict screen shots in accordance with a particular embodiment of the invention.

DESCRIPTION OF SPECIFIC EMBODIMENTS

1.0 Introduction

A preferred embodiment of an information analysis and visualization method according to the invention has been reduced to practice and is made available for use in select embodiments and in conjunction with products under the trade names "DR-LINK™," and "MAPIT™". The method for interactively retrieving, visualizing and navigating through textual information extracted from multiple documents of the present invention has been implemented in two embodiments. In the first such embodiment, the method has been programmed in the Java and C programming languages. In a second embodiment, the method has been programmed in the JavaScript and Perl programming languages.

1.1 Hardware Overview

Figure 1A:
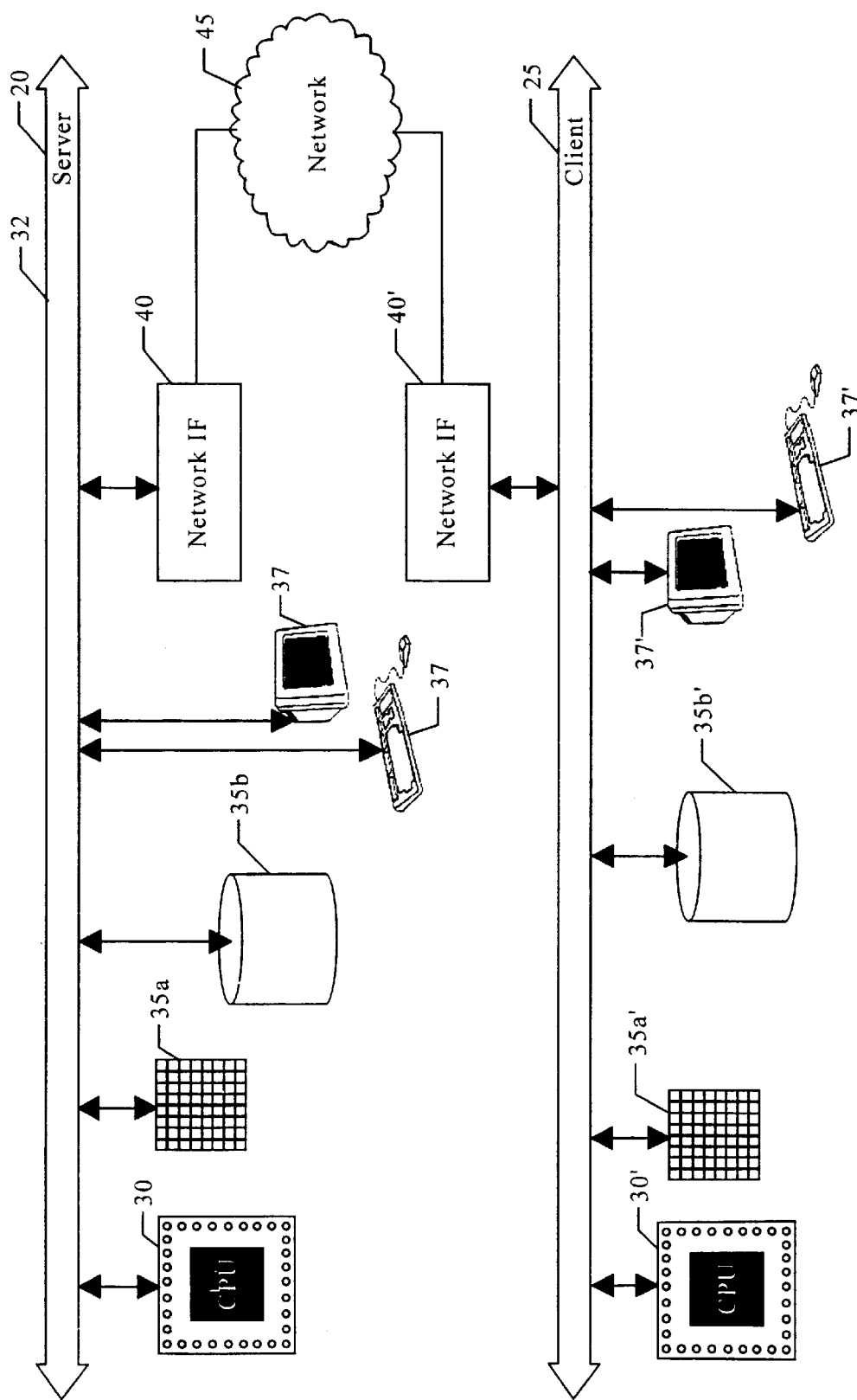
FIG. 1A depicts a representative client server relationship in accordance with a particular embodiment of the invention.

The method for interactively retrieving, visualizing and navigating through textual information extracted from multiple documents of the present invention is operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprising a memory subsystem 35a and a file storage subsystem 35b, holding computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC™ server. Corresponding elements and subsystems in the client computer are shown with corresponding, but primed, reference numerals.

The user interface input devices typically includes a keyboard and may further include a pointing device and a scanner. The pointing device may be an indirect pointing device such as a mouse, trackball, touchpad, or graphics tablet, or a direct pointing device such as a touchscreen incorporated into the display. Other types of user interface input devices, such as voice recognition systems, are also possible.

The user interface output devices typically include a printer and a display subsystem, which includes a display controller and a display device coupled to the controller. The display device may be a cathode ray tube (CRT), a flat-panel device such as a liquid crystal display (LCD), or a projection device. Display controller provides control signals to the display device and normally includes a display memory for storing the pixels that appear on the display device. The display subsystem may also provide non-visual display such as audio output.

The memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

The file storage subsystem provides persistent (non-volatile) storage for program and data files, and typically includes at least one hard disk drive and at least one floppy disk drive (with associated removable media). There may also be other devices such as a CD-ROM drive and optical drives (all with their associate removable media). Additionally, the computer system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site of the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of PCs and workstations.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
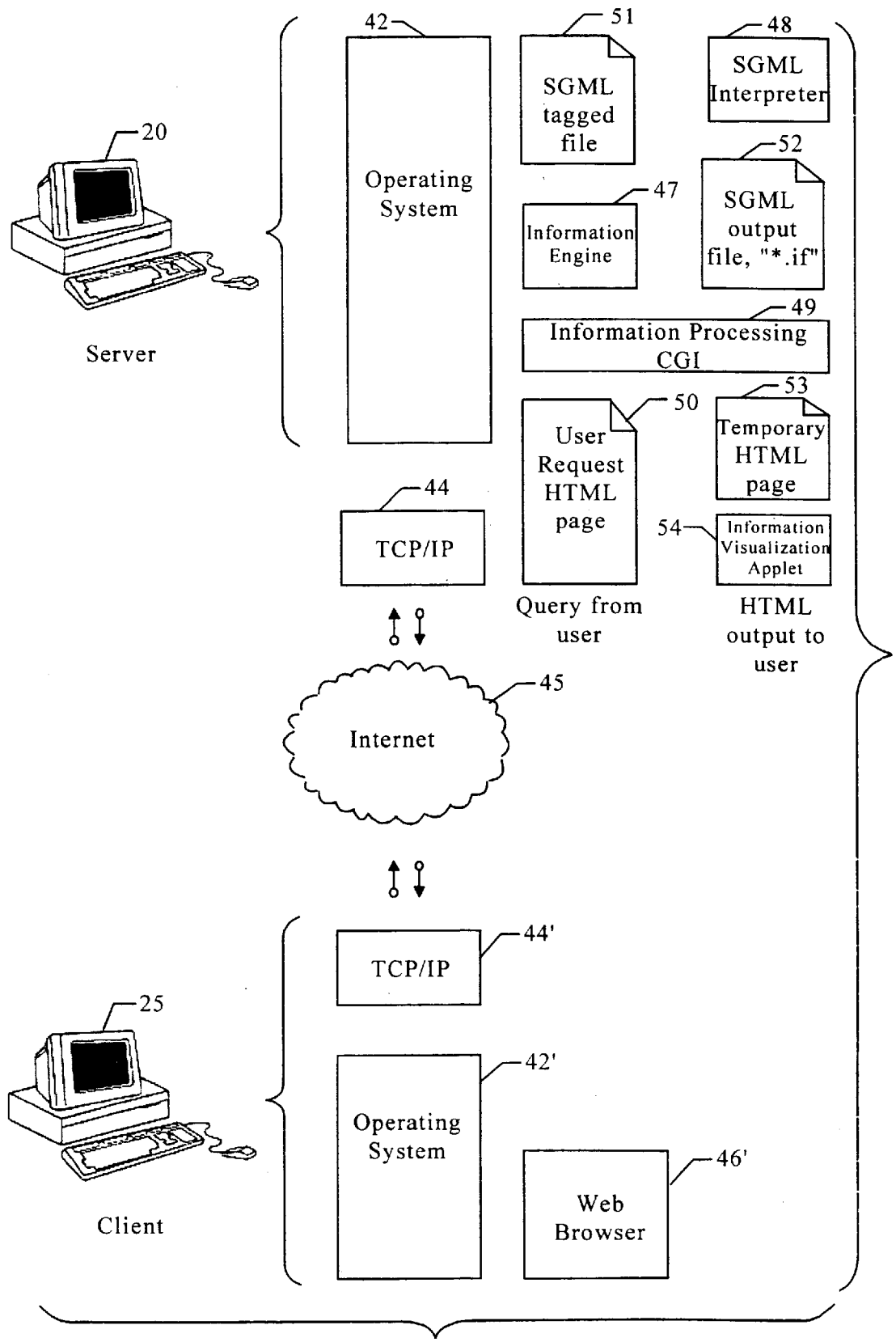
FIG. 1B depicts a functional perspective of interactively retrieving, visualizing and navigating through textual information in accordance with a particular embodiment of the invention.

FIG. 1B is a functional diagram of the computer system such as that of FIG. 1A having functional components for interactively retrieving, visualizing and navigating through textual information extracted from multiple documents according to the invention. FIG. 1B depicts a server 20, and a representative client 25 of a plurality of clients which may interact with the server 20 via the Internet 45 or any other communications method. Blocks to the right of the server are indicative of the processing components and functions which occur in the server's program and data storage indicated by blocks 35a and 35b in FIG. 1A. A TCP/IP "stack" 44 works in conjunction with Operating System 42 to communicate with processes over the network interface 40 attaching Server 20 to Internet 45. User requests from the Client are input to the Server in the form of a User Request Hypertext Markup Language (HTML) page 50. An Information Processing Common Gateway Interface (CGI) script 49 passes the user request to an Information Engine 47 which retrieves multiple documents or real-time news. It may be included in the server shown, or provided at a separate server that is accessible to the shown server through a public or private network or internet 45.

Specific implementations of the Information Engine include, without limitation, conventional boolean search engines such as those produced by Digital Equipment Corporation, information engines employing natural language processing such as DR-LINK produced by Manning & Napier Information Services, news retrieval systems such a those produced by Pointcast Technologies, Inc., and the like. Responses to client queries are formulated by the information engine 47 as an SGML-tagged file 51. The SGML-tagged file is parsed by an SGML interpreter 48 in order to extract useful information, which is formulated by Information Processing CGI 49 into a temporary Hypertext Markup Language document 53. In select embodiments, HTML document 53 includes an information visualization applet ("the Applet") 54. The HTML 53 is communicated via Internet 45 back to the client.

Client 25 in FIG. 1B possesses software implementing functional processes operatively disposed in its program and data storage as indicated by block 35a' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for information via User Request HTML page 50. The user of the client may interact via web browser 46' to make such queries of server 20 via Internet 45 and to view responses from server 20 in the form of temporary HTML document 53, via Internet 45 on web browser 46'.

In select embodiments, the information retrieved by the Information Engine 47 (i.e., multiple documents, real-time news or other information) may be encoded by an SFC encoder according to its thematic information content. A Subject Field Coder (SFC) tags content-bearing words in a text with a disambiguated subject code using a lexical resource of words whose senses are grouped by subject categories.

A subject field code indicates the conceptual-level sense or meaning of a word or phrase. The present invention, however, is not limited to a specific hierarchical arrangement or a certain number or scheme of subject field codes.

Each information bearing word in a text is looked up in a lexical resource. If the word is in the lexicon, it is assigned a single, unambiguous subject code using, if necessary, a process of disambiguation. Once each content-bearing word in a text has been assigned a single SFC, the frequencies of the codes for all words in the document are combined to produce a fixed length, subject-based vector representation of the document contents. This relatively high-level, conceptual representation of documents and queries is a useful representation of texts used for later matching and ranking.

Polysemy (the ability of a word to have multiple meanings) is a significant problem in information retrieval. Since words in the English language have, on average, about 1.49 senses, with the most commonly occurring nouns having an average of 7.3 senses, and the most commonly occurring verbs having an average of 12.4 senses, a process of disambiguation is involved in assigning a single subject field code to a word.

Words with multiple meanings (and hence multiple possible subject field code assignments) are disambiguated to a single subject field code using three evidence sources (this method of disambiguation has general application in other text processing modules to help improve performance):

Local Context: If a word in the sentence has been tagged with only one concept group code, this concept group code is considered Unique. Further, if there are any concept group codes which have been assigned to more than a predetermined number of words within the sentence being processed, these concept group codes are considered Frequent codes. These two types of locally determined concept group codes are used as "anchors" in the sentence for disambiguating the remaining words. If any of the ambiguous (polysemous) words in the sentence have either a Unique or Frequent concept group code amongst their codes, that concept group code is selected and that word is thereby disambiguated.

Domain Knowledge: Domain Knowledge representations reflect the extent to which words of one concept group tend to co-occur with words of the other concept groups (hence the notion of the domain predicting the sense). For example, within a given sentence, a word with multiple concepts categories is disambiguated to the single concept category that is most highly correlated with the Unique or Frequent concept category. If several Unique or Frequent anchor words exist, the ambiguous word is disambiguated to the correct category of the anchor word with the highest overall correlation coefficient.

Global Knowledge: Global Knowledge simulates the observation made in human sense disambiguation that more frequently used senses of words are cognitively activated in preference to less frequently used senses of words. Therefore, the words not yet disambiguated by Local Context or Domain Knowledge will now have their multiple concept group codes compared to a Global Knowledge database source.

Subject field codes are further discussed in Liddy, E. D., Paik, W., Yu, E. S. & McVearry, K., "An overview of DR-LINK and its approach to document filtering," *Proceedings of the ARPA Workshop on Human Language Technology* (1993).

2.0 Parsing Information in the SGML-Tagged File 2.1 Data Structures for Parsing the SGML-Tagged File In the preferred embodiment of the present invention, the SGML-tagged file 51 includes one or more "Document_Id," tags which identify the beginning of a new document, "Document_Title," tags, which indicate a text string title of the document and "Document_HTML" tags which provide a site reference for the actual document. Each of these tags has an associated token. Tokens defined for these tags according to a particular embodiment are depicted in lines (1) below.

```
char *nameDocumentTitle = "B542";                    (1)
char *nameDocumentId = "B110";
char *nameDocumentHtml = "HTMLDOC".
```

```
enum eFieldTypes                                     (2)
{
    estring     = (1<< 0),
    eSequence   = (1<< 1),
    eDateYMD    = ( 1<< 2),
};
```

The SGML interpreter 48 possesses definitions for the Document_Id, Document_Title and Document_HTML tags, as well as a plurality of "field tags". Field tags in SGML-tagged file 51 contain units of information ("Information Units"). The field-tags each have an associated "field-type" which indicates how the Information units are displayed, sorted and filtered. For example, an "eString" field-type defines a text-string which is treated as an alphanumeric phrase. An "eSequence" field-type defines a numerical sequence which is also treated as an alphanumeric phrase. An "eDateYMD" field-type defines dates. In a present embodiment, an information unit of the field-type "eDateYMD" includes 4 digits of a year, 2 digits of a month, and 2 digits of a day. In a particular embodiment, information units of field-type "eDateYMD" are displayed with an histogram and are filtered with date clamps. In an alternate embodiment, information units of the field-type "eDateYMD" are treated as alphanumeric phrases.

Field-types are defined to the SGML interpreter in a particular embodiment as enumerated bit fields, i.e. (1<<3), (1<<4), as depicted in lines (2) below:

Information units are contained in a plurality of "tInfoField" data structures defined to SGML interpreter 48. Each "tInfoField" possesses a list of entries. Each entry includes a string which describes the name of the field, a field-type descriptor, and the SGML tag that delimits any instance of the field. In a particular embodiment, the order of the entries in each "tInfoField" is the order in which the fields will be displayed in a plurality of panels as described herein below, left to right and top to bottom. Hence, changing the order of the entries changes the order of fields in the chart layout. An illustrative "tInfoField" list from a particular embodiment of the SGML interpreter is provided in lines (3) below:

```
tInfoField field[] =                                 (3)
{
    { "Date of Patent", eDateYMD , "B140"},
    { "Inventor", eString, "B711"},
    { "Assignee", eString, "B731"},
    { "Filed Date", eDateYMD, "B220"},
    { "International Classes", eSequence, "B512"},
    { "U.S. Classes", eSequence, "B522"},
    { "Field of Search", eSequence, "B582"},
    { "References Cited (U.S. patents)", eString, "B561"},
    { "Primary Examiner", eString, "B741"}
};
```

2.2 Processing a User's Request

Figure 2A:
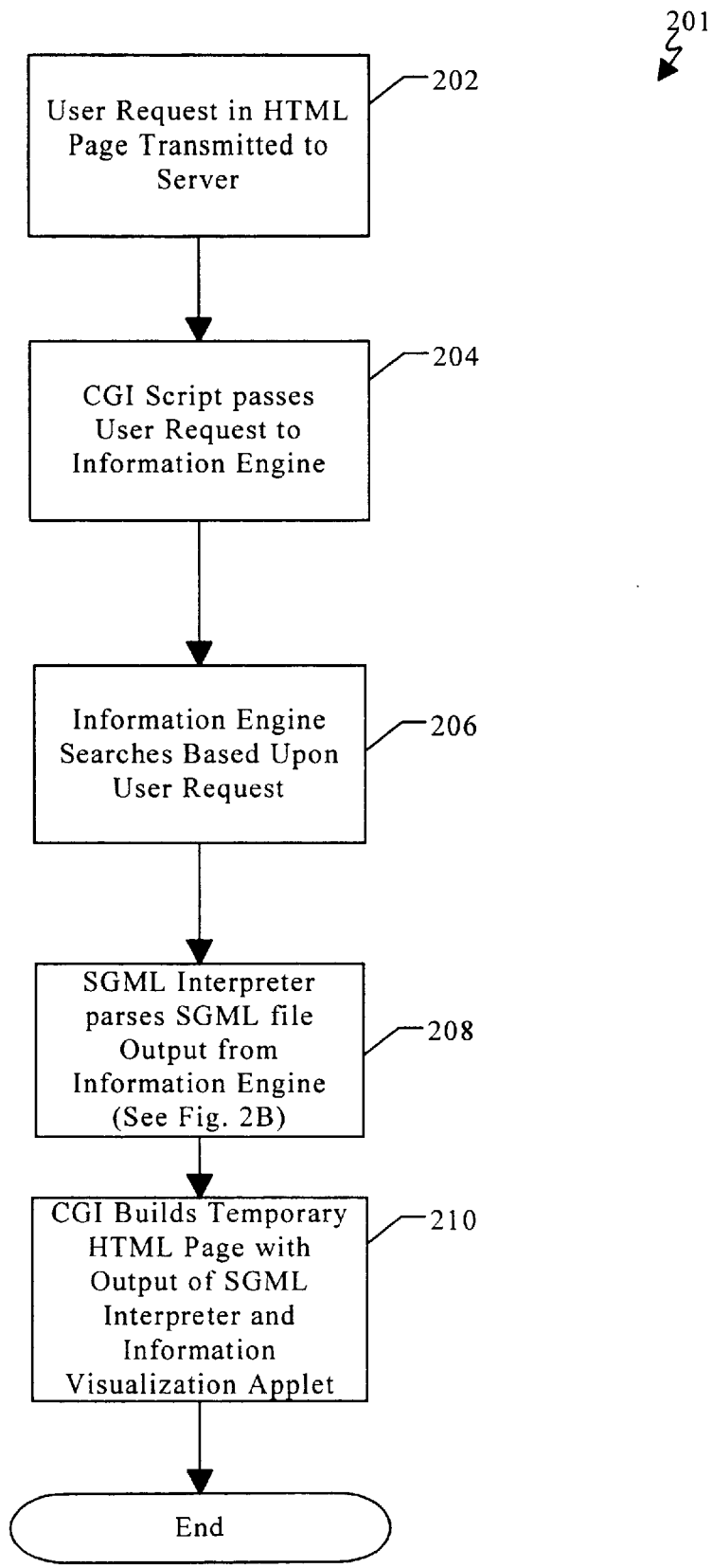
FIGS. 2A–2C depict flow charts of the steps in processing a user request in accordance with a particular embodiment of the invention.

FIG. 2A depicts a flowchart 201 showing steps for the processing of a user request in accordance with a particular embodiment of the present invention. In a step 202 the user's request is input to Server 20 from Client 25 via the User Request HTML page 50. Next, in a step 204, Information Processing CGI script 49 passes the user request to Information Engine 47 to activate a retrieval of multiple documents or of real-time news. In response to the request passed to it in step 204, Information Engine 47 in a step 206 produces SGML-tagged file 51 containing information responsive to the user's request. SGML-tagged file 51 includes zero or more information components delimited at a pair of word-tags, each word-tag contained between "< >," characters. Then, in a step 208, SGML-tagged file 51 is parsed by SGML-interpreter 48 to extract from it information useful to the user. Parsing is described more fully in flowchart 203 herein below.

2.3 Presenting the Information to the User

After the SGML interpreter converts SGML-tagged file 51 into the output file 52, then in a step 210 of flowchart 201, the Information Processing CGI script 49 creates the Temporary HTML page 53 for presentation to Client 25. In a first embodiment, the temporary HTML page includes information visualization applet 54 for visualization of the SGML interpreter output. Screen resolutions for various browsers are accommodated by providing a plurality of temporary HTML pages in several sizes such as, for example: 620×460 and 780×580. Placing a plurality of these temporary HTML pages 53 into a common directory with a daemon 60 (not shown) that awakens periodically to purge files over a certain age provides effective disk space management. An example of temporary HTML page 53 in a particular embodiment follows in lines (4):

```
<html>                                                          (4)
<head><title>InfoLenses (DR_VIEW) </title></head>
<body>
<applet
   code=InfoLenses.class
   id=InfoLenses
   width=1004
   height=748 >
   <param name=nameInfoFile value="mnis.if">
</applet>
</body>
</html>
``` where "mnis.if" is a generic title for the SGML interpreter produced output file 52 which includes that data responsive to the user's request.

2.2.1 SGML Interpreter Processing

Figure 2B:
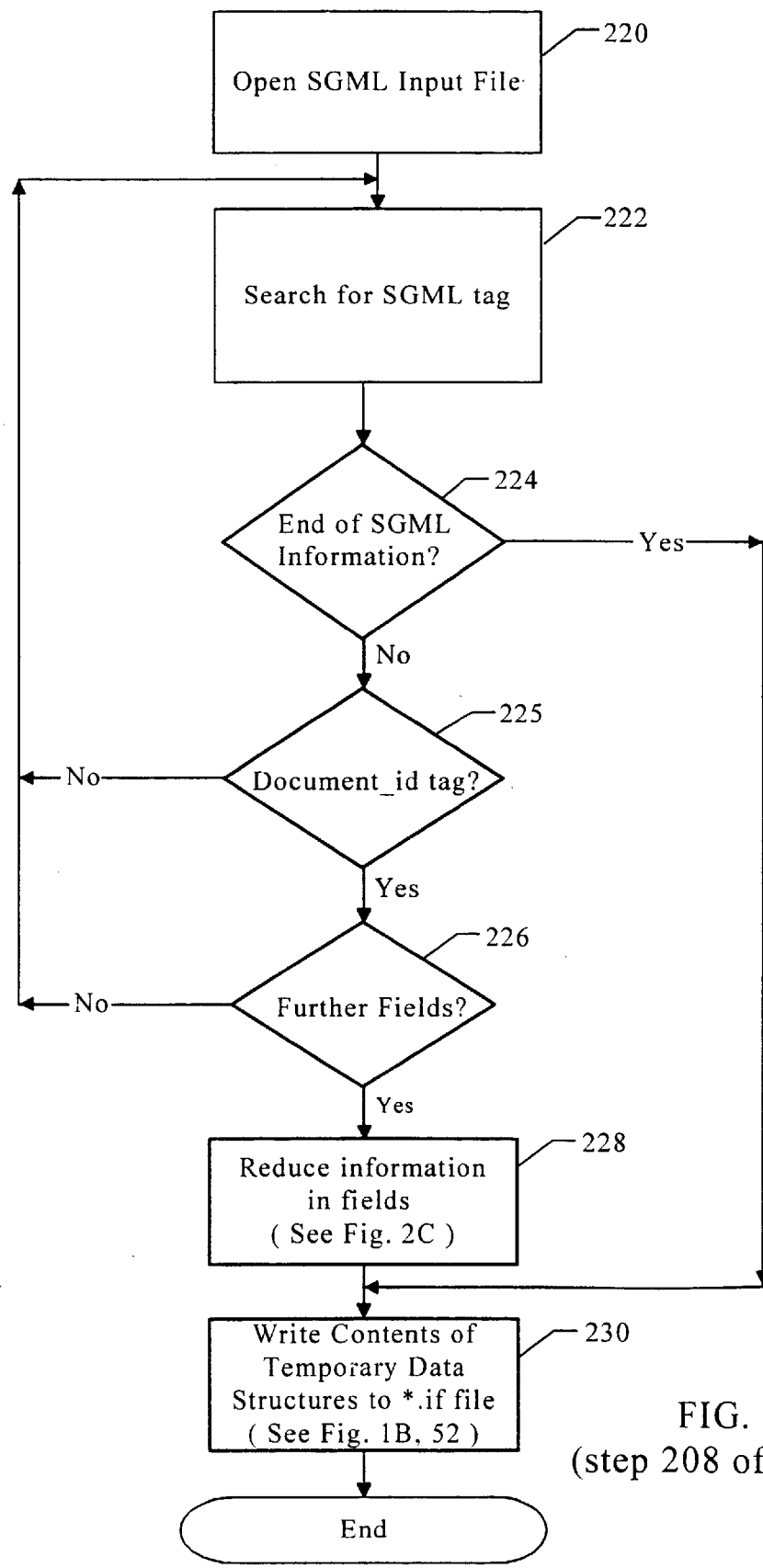

FIG. 2B depicts a flowchart showing the processing steps for step 208 of FIG. 2A, for transforming the SGML-tagged file 51 into a non-directed web of information, fields, and document sources in a newly created output file 52. In a step 220, the SGML interpreter 48 opens the SGML-tagged file 51. In a step 222, the SGML interpreter 48 searches for a "Document_Id" tag or a "Document_Title " tag by their respective tokens, as depicted in lines (1) herein above. In a preferred embodiment, the SGML tags parsed by the SGML interpreter 48 have a first white space-delimited word which is used to identify and match the tags. Thus, if one provides extended tagging information, such as "<DOC_ID RTYPE=HEX>," then only "<DOC_ID" and "</DOC_ID" will be used as tags. Documents not stored in HTML format are processed in an optional step 223 (not shown) interposed between steps 222 and 224, wherein an attempt to open an HTML file signals the server to produce an HTML page in a temp directory which is later destroyed. In a decisional step 224, an end-of-data check is performed for the existence of any SGML tag delimited information. If SGML delimited data is found, then in a decisional step 226, a check is performed for any further fields associated with this "Document_Id" tag. If further fields are encountered, 5 then in a step 228, these fields are also extracted and reduced, i.e., parsed and stored. All connections per information unit handle large SGML files. In a step 230, all reduced data stored in temporary files are copied to newly created output file 52, and all temporary files are destroyed upon the SGML interpreter's completion. The resulting output file 52 is appended with an "*.if" file indicator.

Figure 2C:
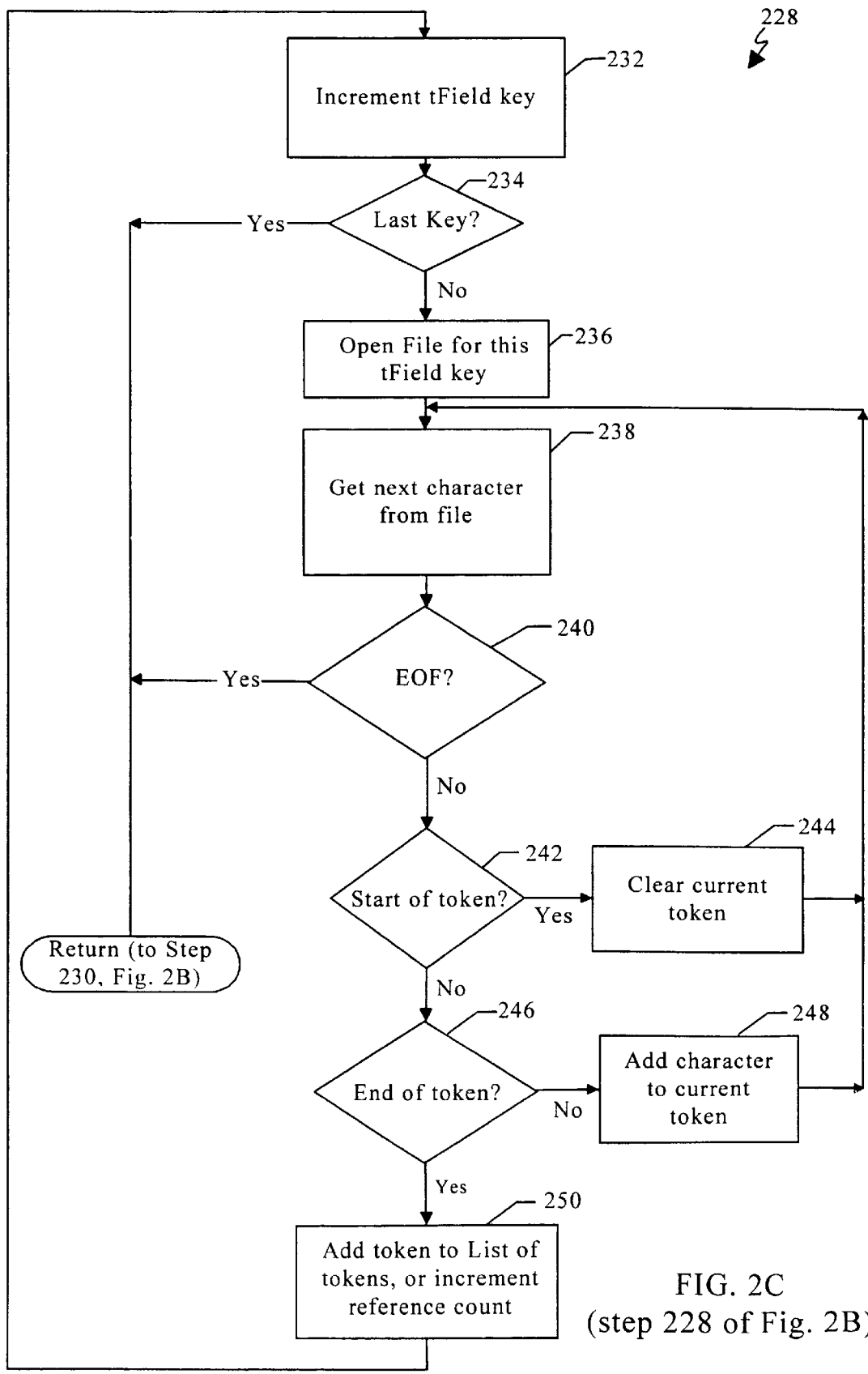

FIG. 2C depicts a flowchart showing the processing steps comprising step 228 of flowchart 203. The processing depicted by this flowchart loops on a tInfo key, which is an index into the collection of "tInfofields" such as depicted in lines (3) herein above. In a step 232, the tField key is incremented and in a decisional step 234 it is checked to see if a final key value, which is the number of tInfofields, has been reached. If the final key has been reached, then the routine has processed all information and processing returns, passing control to step 230 of FIG. 2C. If the last key has not been reached, then in a step 236, a file corresponding to this "tInfofield" key is opened. Next, in a step 238, a character is read from the file opened in step 236. In a decisional step 240, the character read in step 238 is checked to see if it is an end of file (EOF) character. If it is an end of file character, then the processing returns, passing control to step 230. Otherwise, in a decisional step 242, the character is checked to see if it is the start of a token. If it is the start of a token, then in a step 244, a current token buffer is cleared in order to accumulate characters of this new token. Processing continues with step 238 getting the next character from the file. Otherwise, in a decisional step 246 the character is checked to see if it is an end of token character. If it is not an end of token character, then in a step 248, the character is added to the current token buffer and processing continues with step 238 getting the next character from the file. Alternatively, if in step 246, an end of token character is detected, then in a step 250 the current token buffer is added to a list of tokens, or if it is already in the list of tokens, a reference count of the number of times this token appears in the file is incremented and processing continues with step 232 wherein the next "tInfofield" key is searched. This processing is also described by the following pseudocode in lines (5).

```
void TokenizeIntermediateData (void)
{
    FILE *fp;
    int count=0, cpcount=0,numstrings=0,KEY;
    char c,word[WORDMAX],curpat[10];
        for (KEY=0;KEY<numFields;KEY++) // loop through all tFields
        {
            printf(".");
            if (!(fp=fopen(filename[KEY],"r")))
                continue;
            while ((c=fgetc(fp))!=EOF) // parse individual files
// for each KEY
            {        if (c=='<') {count=0; }
                     else
                     if (c=='>')
            {
                     word[count]='\0';
                     while ((c=fgetc(fp)) !=EOF)
                     {    if (c==',') {curpat[cpcount]='\0';
                                          cpcount=0;
                                          break; }
                          else curpat (cpcount++) =c;
                     }
                     AddOrIncrement (word, atoi (curpat) ,
```

-continued

```
            &FieldHead [KEY]);
        }
        else {if (count<WORDMAX) word[count++]=c;
        }
    }
    fclose(fp);
}// for KEY
}
```

In a particular embodiment of the present invention, in a step 209 (not shown), interposed between step 208 and step 210, the output file 52 is compressed (e.g., Huffman encoded) to provide further compression for transfer over the web. The SGML interpreter includes routines to both "Expand" and "Compress" the data output file 52. These routines are a fairly straightforward implementation of Huffman encoding which builds a Huffman Tree of Codes based on symbol frequency as is well known in the art. The Compress routine reduces the data set size by about 30% to 50% (in comparison, LHA and PKZIP, two compression schemes which are also well known in the art, which both use a tighter compression algorithm based on Lempel-Ziv, delivered 45%–65% reduction).

3.0 Visualizing Information 3.1 Information Visualization Applet

A first embodiment displays the results of information queries to the user using information visualization applet 54 embedded in HTML page 53. Information visualization applet 54 is implemented as a Java applet which runs in client machine 25.

3.1.1 Information Visualization Applet Data Structures

Figure 3:
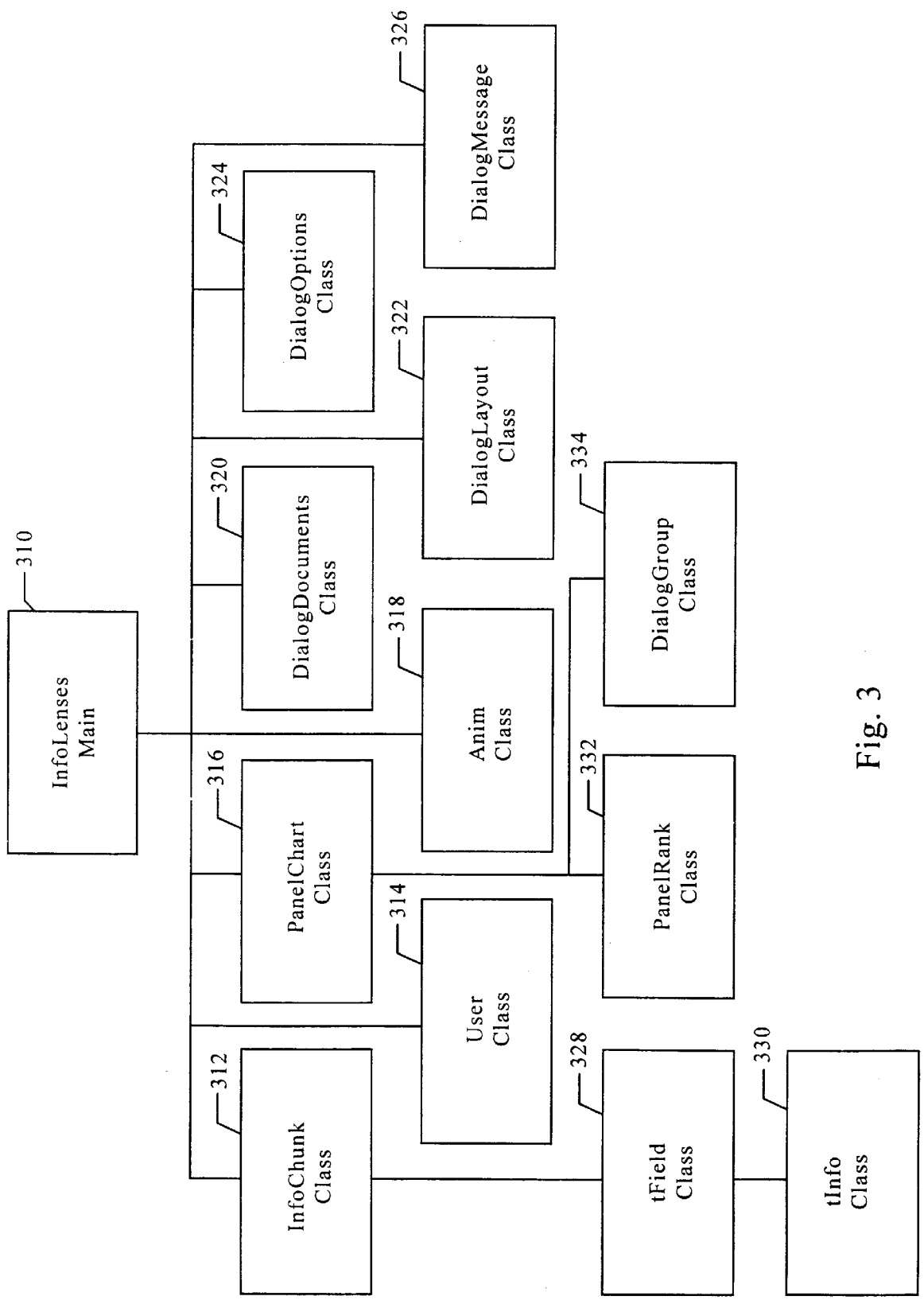
FIG. 3 depicts a representative block diagram of component classes of a Java applet in accordance with a particular embodiment of the invention.

FIG. 3A is a block diagram of the major components of an information visualization applet which operates according to a particular embodiment of the present invention. The major components include an InfoLenses Main Class 310, an InfoChunk Class 312, a User Class 314, a PanelChart Class 316, an Anim Class 318, a DialogDocuments Class 320, a DialogLayout Class 322, a DialogOptions Class 324, a DialogMessage Class 326, a tField Class 328, a tInfo Class 330, a PanelRank Class 332, a DialogGroup Class 334 and a DialogDate Class (not shown). While each is implemented in this embodiment as a Java class, it should be understood by those skilled in the art that each component may be implemented in other programming languages without departing from the spirit of the present invention.

Anim: is a threaded class which cycles through images to display an animation with synchronous timings. Anim provides a "CYCLE" command which moves through a plurality of images in order to provide an animated display.

DialogDate: is used to enter filtering dates.

DialogDocuments: provides a list for selecting among a group of Document Identifiers and Titles. It is used to open a particular document as an HTML file in either the current browser's frame or as a new browser window.

DialogGroup: selects a field for display from a set of fields having pertinent unfiltered information units.

DialogLayout: selects among a choice of layout configurations for the plurality of panels in the display to the user. In a particular embodiment, the choices range from 1×1 to 3×2. DialogLayout provides a simple mechanism for switching between different screen format settings.

DialogMessage: opens dialog boxes, help screens, error messages and other statements which must be brought to the user's immediate attention.

DialogOptions: enables the user to switch between the various environmental settings and to view/release filters.

DialogPrefix: filters through an alphanumeric or number-sequenced list of information units. The current list of information units is sorted and treated as a circular list in which is indexed to the desired prefix or last fitting prefix.

User: contains the set of environmental settings accessed by Dialog Options and messages.

InfoLenses: is the main class which runs a plurality of threads, each thread performing an aspect of processing, services button-menu events, and coordinates the layout of all components. The top-level components consist of the animations, button-menu, and display panels. Its primary responsibility is to control the appearance of the desktop while coordinating timed events and error handling.

PanelChart: determines the order of display for information units of a particular field. Each panel is associated with a field and its data is filtered by one of a plurality of filters incorporated into the InfoChunk class. The PanelChart class hides and displays several components such as the scrollbars for bar charts, a prefix button if there is no current filter, and a PanelRank, as described herein below.

PanelRank: controls the display for each field type. For example, PanelRank includes a bar chart and a date-based histogram display mechanism.

InfoChunk: is the main class which operates upon all data. It is comprised of several fields having a plurality of information units, each of which references one or more documents. A Setup function creates a non-directed acyclic graph from the information units. InfoChunk also has several filters which can have date ranges or actual information units, which act as filters by hiding all documents which do not contain the filtering items.

Subfunctions of the InfoChunk class include, a CalculateMinMaxInfoDates function, which determines an earliest date and a latest date in a dated field; an ApplyFilters function, which sequences through the plurality of information units on a per-filter basis, checking each individual representation in order to acquire a count of references to each information unit.

The sorting functions implement QuickSort routines, which are known in the art, adapted to the types of fields to be sorted and the types of sort keys, i.e, whether references or alphanumerics. Sort speed is a critical issue. It was discovered that recursive embodiments of the sort function are faster than iterative embodiments.

tField: is the group which has an associated plurality of information units, a string name to describe button face, and a collection of string and integer spaces for minimum, maximum and current date ranges.

tInfo: is the information unit encapsulating class. It has a string representation taken from the SGML tags and an integer representation for fast searching of dates and numerical sequences. A NumRefs field represents the total number of documents referenced by the current filter.

3.1.2 Information Visualization Applet Processing

At initialization, the InfoLenses class is instantiated. Animations are loaded and the InfoChunk file is retrieved from a parameter list. Then, the InfoChunk class is created, all display components are created.

After initialization, an event loop is repetitively processed. As the user requests different filtering by clicking information units displayed on the plurality of panels, a combinatorial product of the selected filters is determined and applied to the plurality of information units. A display thread refreshes the screen at a set interval of time, which is four seconds in a select embodiment. Dialogs are created whenever input is required from the user. Inputs from the user are processed and the dialog is destroyed.

Processing halts whenever the user leaves the page. Processing is restarted whenever the user returns to the page.

3.2 Visualization Script Embodiment

A second embodiment displays the results of information queries to the user using a collection of JavaScript functions which operate upon a plurality of information objects in client machine 25.

3.2.1 Visualization Script Data Structures

In this preferred embodiment, a frequency measurement and a mask are determined for a plurality of information fields from the plurality of information units determined by the SGML processing described herein above. Related information fields are grouped collectively into information objects, each object having a plurality of information field names, defamed as text strings, each of which has an associated unique information field numerical identifier. Information objects also possess a frequency array, which contains a frequency of occurrence for each corresponding information field, a shown flag, which indicates that an information field within the object has at least one occurrence in the plurality of information units. For example, in lines (6) below, an "organizations" information object possess information fields, "European Union" and "United Nations", which have associated unique information numerical dentifiers, "6291456" and "3072", respectively:

```
tO = new Object();                          (6)
tO.elementID = 5
tO.label = "Organization (general)";
tO.self = "tO";
tO.shown = 0;
tO.size = 24;
tO.size1 = 25;
tO.mask25 = THEMASK;
tO.mask50 = THEMASK;
tO.mask75 = THEMASK;
tO.mask100 = THEMASK;
tO.pd25 = new Array(tO.size1);
tO.freq = new Array(tO.size);
tO.p = new Array(tO.size);
tO.i = new Array (4);
for    (i=0; i<4; i++)
       tO.i[i] = tO.size;
tO.p [1] = 'European Union';
tO.pd25 [1] = 6291456;
tO.p [2] = 'United Nations';
tO.pd25 [2] = 3072;
:
:
tO.p [23] = 'World Trade Organization';
tO.pd25 [23 ] = 16384;
tO.pd25 [24] = THEMASK;
```

In a particular embodiment, information objects contain information fields in the categories of Countries, Persons, Organizations, Companies, Governments and Subject areas. A plurality of masks are provided for dividing filtering into multiple levels. In a particular embodiment, there are four masks, labeled, mask25, mask50, mask75 and mask100.

3.2.2 Visualization Script Functions

A preferred embodiment in implemented as a callable library of Java Script functions. These functions are user input driven. Source code for these functions is reproduced in Appendices A–F and is incorporated herein by reference for all purposes.

A function CalcFreos determines a frequency measurement for each information field in the plurality of information units. In a preferred embodiment, this frequency measurement is displayed as a bar graph of a length proportionate to the frequency of a particular information field in the plurality of information units. CalcFreq processing would increment a frequency field in the frequency array, tO.freq in the example of lines (6), for each instance of its corresponding information field, such as "European Union" found in the plurality of information units. If any of the information fields in a particular information object are located within the plurality of information units, the shown flag, tO.shown in the example of lines (6), is incremented to a one.

A function CalcMask determines an overall mask for all information fields in the plurality of information units. Firstly, an object mask for each information object is determined from a plurality of submasks associated with each particular panel selected by the user. Next, these object masks are combined to produce an overall mask for the entire information data set.

A function doTheChange determines based upon user input the panels to be displayed. Firstly, the user's input is analyzed to determine an information object corresponding to the user's selection. Next, a plurality of panel submasks in the information object are set to indicate the selection of the user. Next, function CalcMask is invoked to recompute the overall mask. Finally, the function CalcAndDisplay is invoked to display panels corresponding to the user's selection.

A function CalcAndDisplay displays panels having information fields corresponding to categories selected by the user. Firstly, it invokes function CalcFreqs to update the frequency calculations for an information object. Next it displays the results as a plurality of user selectable panels, each panel having a bar graph associated with information fields which the CalcFreqs processing has determined are contained in the plurality of information units.

A function writeObject invokes an appropriate initialization function for the information object corresponding to the selections passed into it. Next, it invokes function CalcAndDisplay for the information object initialized.

A function doLoad loads and initializes an HTML screen for the user.

A function Test25 determines based upon an input starting point and a mask, which of the next 25 documents, from which the plurality of information units was derived, are in categories selected by the user as coded by the mask.

A function writeHeads displays headlines, i.e., titles of documents, corresponding to the information units displayed in the selected panels. Firstly, it invokes function Test25 to screen 25 candidate documents against a mask of selected panels having relevant information. Next, it displays the documents resulting from the Test25 screening to the user.

4.0 Techniques for Visualizing Information

Figure 4A:
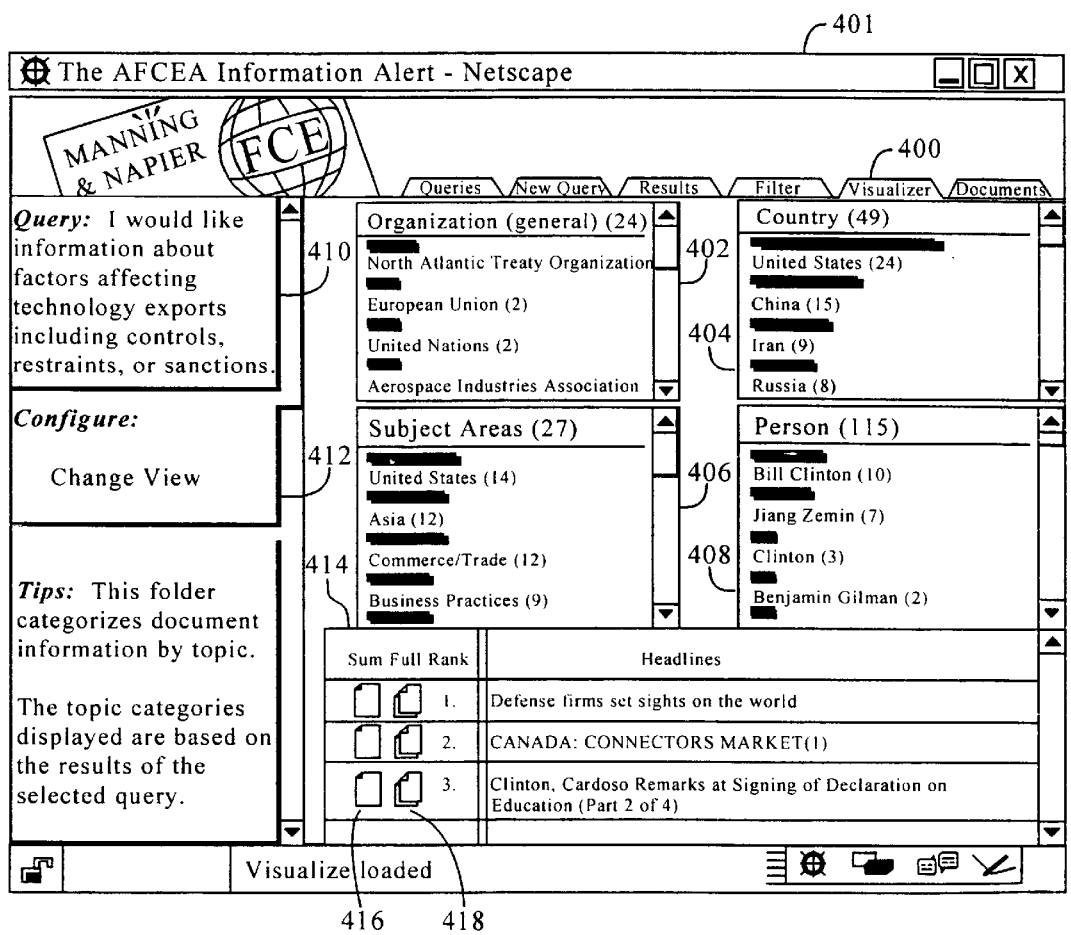

FIGS. 4A–4D illustrate screen shots in a particular embodiment of the information visualization processing. FIG. 4A depicts a screen 401 displaying a representative presentation of the information in a particular collection of documents. A query panel 410 displays a text of a natural language query used in the formation of the collection of documents being displayed and analyzed. A plurality of information analysis panels 402, 404, 406 and 408 are available to the user by selecting a visualizer folder 400. Each analysis panel depicts a particular subject field. The number of information units per a subject field is indicated with a bar graph and numbers contained in parenthesis next to the name of the subject field. For example, panel 402 depicts the organization subject field which has 24 information units associated with it which are distributed among organizations such as North Atlantic Treaty Organization and European Union. A change view button 412 displays a dialog screen which enables a user to select among a list of layout options for the information panels. Screen 401 depicts information panels 402, 404, 406 and 408 arranged in a 2×2 layout. Other layouts include a 3×2 layout and a 2–3 layout. In either case, four panel or six panel layouts, the panels with the most information units are automatically selected for display. A headlines panel 414 displays a list of document identifiers and titles for all the documents filtered through the information visualization process. The user may select a particular document for display by clicking a "sum" button 416 to view a summary of the document, or by clicking a "full" button 418 to view a full text display of the document.

Figure 4B:
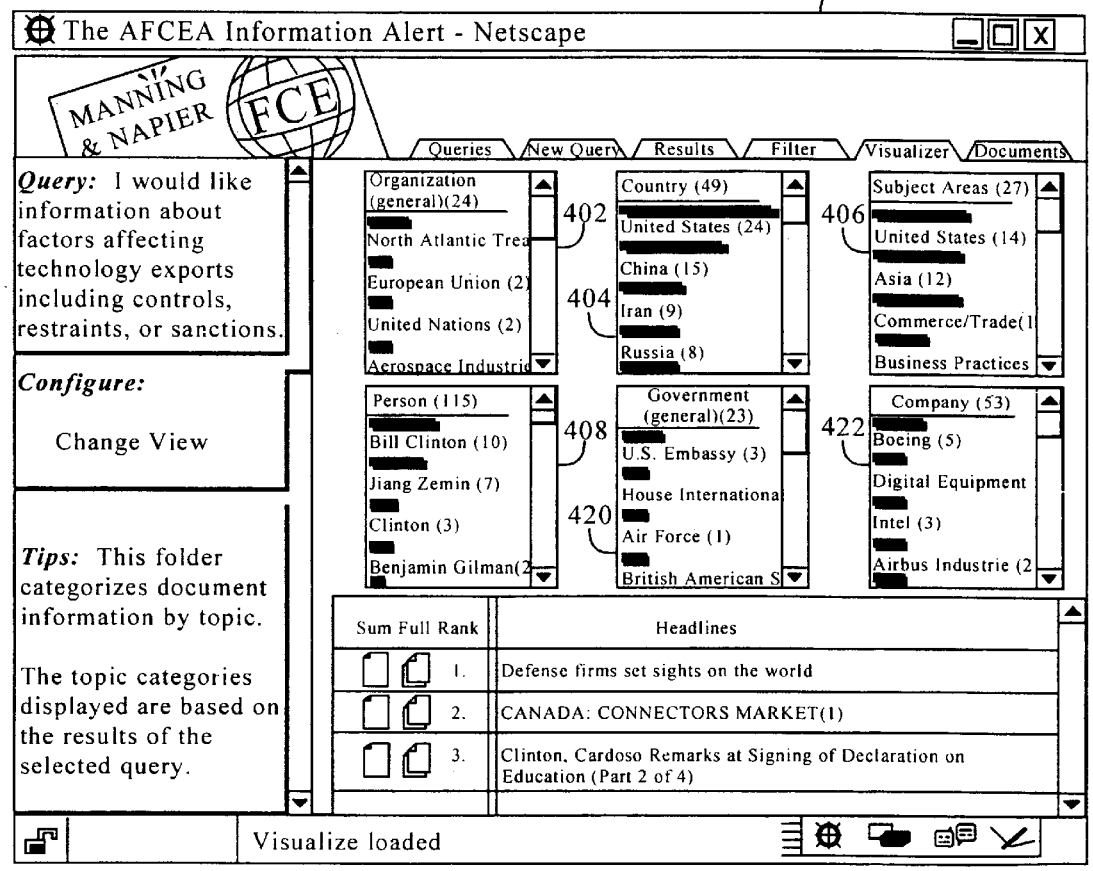

FIG. 4B depicts a screen 403 of information analysis panels arranged in a 3×2 format. The panels contain information units from six fields having the highest number of information units. In addition to panels 402, 404, 406 and 408 depicted in FIG. 4A, panels 420 and 422 are now also displayed along with their information units.

As in FIG. 4A, the number of information units per field is indicated with a bar graph and numbers contained in parenthesis next to the name of the subject field. For example, in the "person" field, note that ten documents contain the "Bill Clinton" information unit.

FIG. 4C depicts a screen 405 which shows the results of adding filters to subject areas and persons. Selecting an information unit causes a darkened check mark to appear next to the bar chart of the selected information unit. Additionally, the visualization process now computes a combinatorial product of the selected filters and applies it to the documents. In a preferred embodiment, this filters out all documents which do not contain the selected information unit and recalculates each panel to show the information unit statistics for only those documents containing the selected information unit. For example, in panel 406, the information units "United States, Asia," and "commerce/trade" have been selected and in panel 408, the person "Jiang Zemin" has been selected. These fields are displayed with darkened check marks next to their bar charts. In addition, all panels are recalculated to depict the information unit statistics for only those documents in the solution set which contain information units having the particular selected fields. For example, the number of information units in the person's panel 408 has been reduced from 115 to 31. FIG. 4C depicts it as (31/115). Similarly, headlines panel 414 now depicts only those document titles for documents containing one or more of the information units which have been selected.

Selecting one or more information units from different information panels causes several filters to be applied to the documents. Thus, the visualization process filters out all documents that do not contain the combination of selected information units and then recalculates each information panel to show the information unit statistics for only those documents containing all of the selected information units. Accordingly, FIG. 4C depicts only those documents and information units having the selected areas of "United States, Asia, Commerce/Trade" and "Jiang Zemin." Where "Jiang Zemin" is a person in the panel for person panel 408, and "United States, Asia, Commerce/Trade" are subject areas selected in subject area panel 406. Accordingly, the four panels have been recalculated to show information unit statistics for only those documents containing the combination of "United States, Asia," and "Commerce/Trade" and "Jiang Zemin."

Figure 4D:
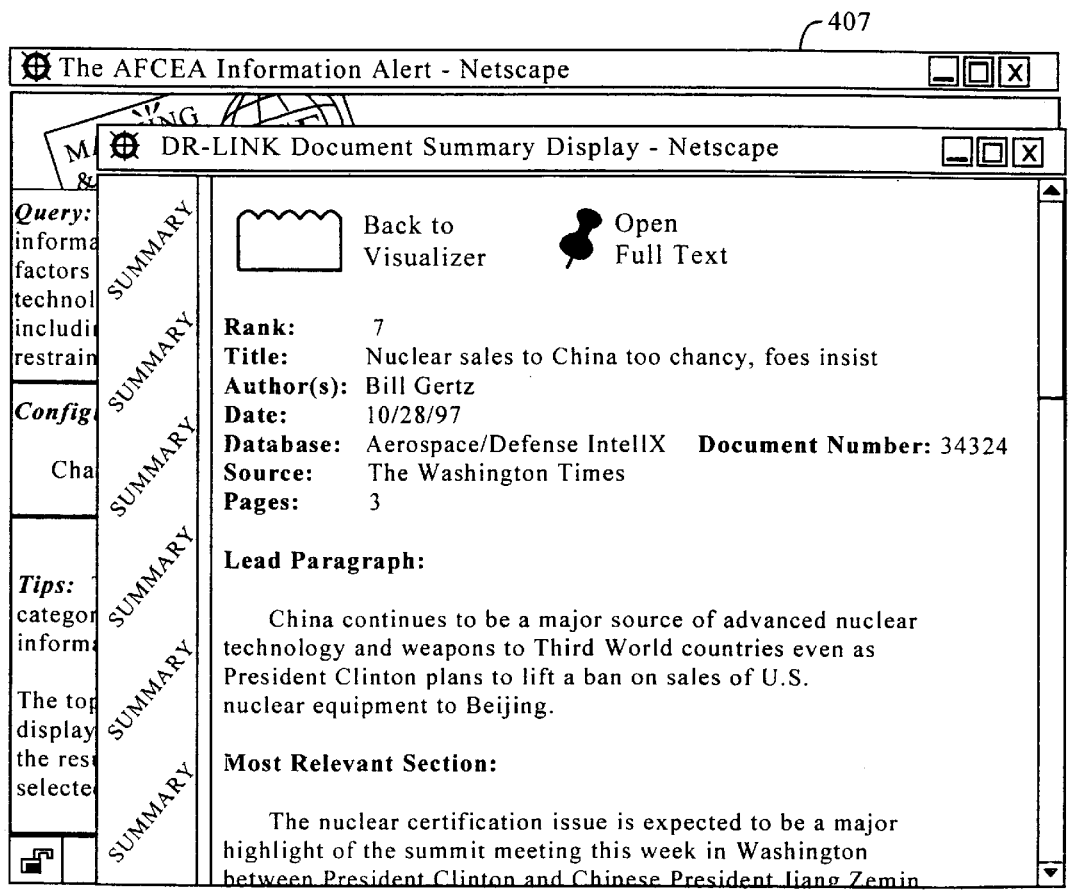

FIG. 4D depicts a summary display of a particular document which contains the subject fields of interest responsive to the subject areas and persons filters indicated in FIG. 4C. As described herein above, this summary is obtained by clicking a "sum" button 416 in screen 405 of FIG. 4C. A full text of the document is available by clicking a "full" button 418.

5.0 Conclusion

In conclusion, the present invention provides for extracting information from a plurality of documents according to a set of pre-defined categories, upon which a visual representation of the extracted information is provided, enabling users to analyze the information in the documents by applying a succession of filters and viewing the results. An advantage of the present invention is that it provides a flexible, easy to use interface to a number of next generation search engines. A further advantage is that information content is visualized in an easy to understand representation such as a bar chart, and that information is grouped according to a set of pre-defined categories, which provides the user with visual indication of relationships between the information in various documents.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

Appendix A

```
<BASE HREF="file:///C|/My Documents/Viz-patent/visual0.htm">

<HTML>
<HEAD>
<TITLE>Visualizer</TITLE>
<SCRIPT>
var THEMASK = 0xffffffff;
var theMask25 = THEMASK;
var theMask50 = THEMASK;
var theMask75 = THEMASK;
var theMask100 = THEMASK;
var tO;
var tT;
var tTh;
var tF;
var tFI;
var tS;
var     theHeadFrame;
////////////////////////////////////
function    Test25(startAt, myMask)
{
        if      (startAt == 0)
        {
                l = (top.theQs[top.theQuery].numDocs > 25) ? 25 :
top.theQs[top.theQuery].numDocs;
                x = (top.theQs[top.theQuery].numDocs >= 25)? 0x1000000 :
0x1 << (top.theQs[top.theQuery].numDocs - 1);
        }
        else if (startAt == 25)
        {
                l = (top.theQs[top.theQuery].numDocs > 50) ? 50 :
top.theQs[top.theQuery].numDocs;
                x = (top.theQs[top.theQuery].numDocs >= 50)? 0x1000000 :
0x1 << (top.theQs[top.theQuery].numDocs - 26);
        }
        else if (startAt == 50)
        {
                l = (top.theQs[top.theQuery].numDocs > 75) ? 75 :
top.theQs[top.theQuery].numDocs;
                x = (top.theQs[top.theQuery].numDocs >= 75)? 0x1000000 :
0x1 << (top.theQs[top.theQuery].numDocs - 51);
        }
        else    {
                l = top.theQs[top.theQuery].numDocs;
                x = 0x1 << (top.theQs[top.theQuery].numDocs - 76);
        } for     (i=startAt; i<l; i++)
        {
                if      (x & myMask)
                {
                        j = i + 1;
                        theHeadFrame.document.write("<TR><TD VALIGN=TOP>");

theHeadFrame.document.write("<A HREF='h.htm';
onMouseOver='top.doMessage(1);return true;' onClick=\"top.DocWin(" +
top.theQuery + ", " + i + ", false);return false;\">");
                        if
(top.theQs[top.theQuery].docs[i].sumFlag == true)

theHeadFrame.document.write("<CENTER><IMG HSPACE=5 VSPACE=0 BORDER=0
SRC='images/newdoc.gif'></A>");
                        else    theHeadFrame.document.write("<CENTER><IMG
HSPACE=5 VSPACE=0 BORDER=0 SRC='images/doc.gif'></A>");

theHeadFrame.document.write("</TD><TD VALIGN=TOP><A
```

2

```
HREF='h.htm'; onMouseOver='top.doMessage(2);return true;'
onClick=\"top.DocWin(" + top.theQuery + ", " + i + ", true);return
false;\">");
                    if
(top.theQs[top.theQuery].docs[i].docFlag == true)

theHeadFrame.document.write("<CENTER><IMG HSPACE=5 VSPACE=0 BORDER=0
SRC='images/newdocs.gif'></A>");
                    else    theHeadFrame.document.write("<CENTER><IMG
HSPACE=5 VSPACE=0 BORDER=0 SRC='images/docs.gif'></A>");
                        theHeadFrame.document.write("</TD><TD
VALIGN=TOP><CENTER>" + j + ".</TD><TD VALIGN=TOP>");

theHeadFrame.document.write(top.theQs[top.theQuery].docs[i].head);
                    theHeadFrame.document.writeln("</TD><TR>");
            }
            x = x >>> 1;
        }
}
////////////////////////////////////
function writeHeads()
{
        theHeadFrame.document.open();
        theHeadFrame.document.writeln("<HTML><BODY
BACKGROUND='images/docpaper.gif' BGCOLOR='#ffcc99' LINK='0x000000'
VLINK='0x000000'>");
        theHeadFrame.document.writeln("<TABLE BORDER=0 CELLPADDING=0
CELLSPACING=0><TR>");
        theHeadFrame.document.writeln("<TD><CENTER><FONT
SIZE=1>Sum</TD><TD><CENTER><FONT SIZE=1>Full</TD><TD WIDTH=30><CENTER><FONT
SIZE=1>Rank</TD><TD><CENTER><B>Headlines</TD></TR>");

Test25(0, theMask25);

if      (top.theQs[top.theQuery].numDocs > 25)
                Test25(25, theMask50);

if      (top.theQs[top.theQuery].numDocs > 50)
                Test25(50, theMask75);

if      (top.theQs[top.theQuery].numDocs > 75)
                Test25(75, theMask100);

theHeadFrame.document.writeln("</TABLE></BODY></HTML>");
        theHeadFrame.document.close();
}
////////////////////////////////////
function Headlines(who)
{
        if      (who != null)
                theHeadFrame = who;

writeHeads();
        return true;
}
////////////////////////////////////
function ONEInit()
{
        tO = new Object();
        tO.elementID = 5;
        tO.label = "Organization (general)";
        tO.self = "tO";
        tO.shown = 0;
        tO.size = 24;
        tO.size1 = 25;
        tO.mask25 = THEMASK;
        tO.mask50 = THEMASK;
```

3

```
        t0.mask75 = THEMASK;
        t0.mask100 = THEMASK;
        t0.pd25 = new Array(t0.size1);
        t0.freq = new Array(t0.size);
        t0.p = new Array(t0.size);
        t0.i = new Array(4);
        for     (i=0; i<4; i++)
                t0.i[i] = t0.size;
        t0.selPer = "Todd";
        t0.p[0] = 'North Atlantic Treaty Organization';
        t0.pd25[0] = 20971584;
        t0.p[1] = 'European Union';
        t0.pd25[1] = 6291456;
        t0.p[2] = 'United Nations';
        t0.pd25[2] = 3072;
        t0.p[3] = 'Aerospace Industries Association';
        t0.pd25[3] = 16777216;
        t0.p[4] = 'Association of Southeast Asian Nations';
        t0.pd25[4] = 1048576;
        t0.p[5] = 'Canadian Standards Association';
        t0.pd25[5] = 8388608;
        t0.p[6] = 'Center for Strategic';
        t0.pd25[6] = 4;
        t0.p[7] = 'Chinese General Chamber of Commerce';
        t0.pd25[7] = 32;
        t0.p[8] = 'Commercial Service';
        t0.pd25[8] = 1048576;
        t0.p[9] = 'Customs Service';
        t0.pd25[9] = 1048576;
        t0.p[10] = 'European Community';
        t0.pd25[10] = 8388608;
        t0.p[11] = 'Exhibition Center';
        t0.pd25[11] = 32;
        t0.p[12] = 'Foreign Service';
        t0.pd25[12] = 1048576;
        t0.p[13] = 'Gulf Cooperation Council';
        t0.pd25[13] = 2048;
        t0.p[14] = 'Heritage Foundation';
        t0.pd25[14] = 16;
        t0.p[15] = 'Hong Kong Optical Manufacturers Association';
        t0.pd25[15] = 32;
        t0.p[16] = 'Inter-American Development Bank';
        t0.pd25[16] = 4;
        t0.p[17] = 'International Bank for Reconstruction and Development';
        t0.pd25[17] = 4;
        t0.p[18] = 'International Organization for Standardization';
        t0.pd25[18] = 8388608;
        t0.p[19] = 'National Association of Securities Dealers Automated
Quotations';
        t0.pd25[19] = 1;
        t0.p[20] = 'Optical Association';
        t0.pd25[20] = 32;
        t0.p[21] = 'U.S. Foreign Commercial Service';
        t0.pd25[21] = 1048576;
        t0.p[22] = 'World Tourism Organization';
        t0.pd25[22] = 1048576;
        t0.p[23] = 'World Trade Organization';
        t0.pd25[23] = 16384;
        t0.pd25[24] = THEMASK;
}
/////////////////////////////////////
function TWOInit()
{
        tT = new Object();
        tT.elementID = 4;
        tT.label = "Country";
        tT.self = "tT";
```

4

```
tT.shown = 0;
tT.size = 49;
tT.size1 = 50;
tT.mask25 = THEMASK;
tT.mask50 = THEMASK;
tT.mask75 = THEMASK;
tT.mask100 = THEMASK;
tT.pd25 = new Array(tT.size1);
tT.freq = new Array(tT.size);
tT.p = new Array(tT.size);
tT.i = new Array(4);
for     (i=0; i<4; i++)
        tT.i[i] = tT.size;
tT.selPer = "Todd";
tT.p[0]  = 'United States';
tT.pd25[0]= 33553407;
tT.p[1]  = 'China';
tT.pd25[1]= 6093050;
tT.p[2]  = 'Iran';
tT.pd25[2]= 17623554;
tT.p[3]  = 'Russia';
tT.pd25[3]= 16817676;
tT.p[4]  = 'Japan';
tT.pd25[4]= 14811220;
tT.p[5]  = 'Pakistan';
tT.pd25[5]= 843784;
tT.p[6]  = 'U.S.';
tT.pd25[6]= 9715856;
tT.p[7]  = 'Canada';
tT.pd25[7]= 8486992;
tT.p[8]  = 'United Kingdom';
tT.pd25[8]= 11535364;
tT.p[9]  = 'Asia';
tT.pd25[9]= 6664;
tT.p[10] = 'France';
tT.pd25[10]= 16810064;
tT.p[11] = 'Hong Kong';
tT.pd25[11]= 1048620;
tT.p[12] = 'India';
tT.pd25[12]= 6664;
tT.p[13] = 'Brazil';
tT.pd25[13]= 4194624;
tT.p[14] = 'Germany';
tT.pd25[14]= 25165888;
tT.p[15] = 'Iraq';
tT.pd25[15]= 16795648;
tT.p[16] = 'Mexico';
tT.pd25[16]= 324;
tT.p[17] = 'North Korea';
tT.pd25[17]= 51200;
tT.p[18] = 'South Korea';
tT.pd25[18]= 2097472;
tT.p[19] = 'Chile';
tT.pd25[19]= 16777280;
tT.p[20] = 'Czech Republic';
tT.pd25[20]= 16777220;
tT.p[21] = 'Indonesia';
tT.pd25[21]= 263168;
tT.p[22] = 'Libya';
tT.pd25[22]= 18432;
tT.p[23] = 'Soviet Union';
tT.pd25[23]= 16778240;
tT.p[24] = 'Syria';
tT.pd25[24]= 264192;
tT.p[25] = 'Taiwan';
tT.pd25[25]= 16400;
tT.p[26] = 'Thailand';
```

```
        tT.pd25[26]= 16777220;
        tT.p[27]  = 'Venezuela';
        tT.pd25[27]= 4194368;
        tT.p[28]  = 'Argentina';
        tT.pd25[28]= 64;
        tT.p[29]  = 'Bahrain';
        tT.pd25[29]= 16777216;
        tT.p[30]  = 'Bosnia-Herzegovina';
        tT.pd25[30]= 1048576;
        tT.p[31]  = 'Chinese';
        tT.pd25[31]= 16384;
        tT.p[32]  = 'East Timor';
        tT.pd25[32]= 1024;
        tT.p[33]  = 'Ecuador';
        tT.pd25[33]= 4194304;
        tT.p[34]  = 'Greece';
        tT.pd25[34]= 16777216;
        tT.p[35]  = 'Haiti';
        tT.pd25[35]= 64;
        tT.p[36]  = 'Hungary';
        tT.pd25[36]= 16777216;
        tT.p[37]  = 'Kuwait';
        tT.pd25[37]= 16777216;
        tT.p[38]  = 'Malaysia';
        tT.pd25[38]= 4;
        tT.p[39]  = 'Myanmar';
        tT.pd25[39]= 1048576;
        tT.p[40]  = 'Netherlands';
        tT.pd25[40]= 131072;
        tT.p[41]  = 'Panama';
        tT.pd25[41]= 64;
        tT.p[42]  = 'Peru';
        tT.pd25[42]= 4194304;
        tT.p[43]  = 'Poland';
        tT.pd25[43]= 16777216;
        tT.p[44]  = 'Romania';
        tT.pd25[44]= 16777216;
        tT.p[45]  = 'Saudi Arabia';
        tT.pd25[45]= 16777216;
        tT.p[46]  = 'Sino';
        tT.pd25[46]= 128;
        tT.p[47]  = 'Sweden';
        tT.pd25[47]= 256;
        tT.p[48]  = 'Turkey';
        tT.pd25[48]= 16777216;
        tT.pd25[49] = THEMASK;
}
////////////////////////////////////
function THREEInit()
{
        tTh = new Object();
        tTh.elementID = 3;
        tTh.label = "Subject Areas";
        tTh.self = "tTh";
        tTh.shown = 0;
        tTh.size = 27;
        tTh.size1 = 28;
        tTh.mask25 = THEMASK;
        tTh.mask50 = THEMASK;
        tTh.mask75 = THEMASK;
        tTh.mask100 = THEMASK;
        tTh.pd25 = new Array(tTh.size1);
        tTh.freq = new Array(tTh.size);
        tTh.p = new Array(tTh.size);
        tTh.i = new Array(4);
        for     (i=0; i<4; i++)
                tTh.i[i] = tTh.size;
```

6

```
        tTh.selPer = "Todd";
        tTh.p[0]   = 'United States';
        tTh.pd25[0]= 18801107;
        tTh.p[1]   = 'Asia';
        tTh.pd25[1]= 1893562;
        tTh.p[2]   = 'Commerce/Trade';
        tTh.pd25[2]= 25470139;
        tTh.p[3]   = 'Business Practices';
        tTh.pd25[3]= 28508449;
        tTh.p[4]   = 'Govt. Officials/Citizens';
        tTh.pd25[4]= 4768466;
        tTh.p[5]   = 'World Relations/Conditions';
        tTh.pd25[5]= 6309124;
        tTh.p[6]   = 'Economics/Economic Theory';
        tTh.pd25[6]= 10551332;
        tTh.p[7]   = 'Europe';
        tTh.pd25[7]= 2102784;
        tTh.p[8]   = 'War Machinery/Zones';
        tTh.pd25[8]= 17042432;
        tTh.p[9]   = 'Governmental Institutions';
        tTh.pd25[9]= 655872;
        tTh.p[10]  = 'Data Transmission';
        tTh.pd25[10]= 65792;
        tTh.p[11]  = 'Software/Languages/Programming';
        tTh.pd25[11]= 8193;
        tTh.p[12]  = 'Techniques of Warfare';
        tTh.pd25[12]= 6144;
        tTh.p[13]  = 'Banking/Financial Service';
        tTh.pd25[13]= 4;
        tTh.p[14]  = 'Computer Hardware/Peripherals';
        tTh.pd25[14]= 8;
        tTh.p[15]  = 'Computer Technology';
        tTh.pd25[15]= 8;
        tTh.p[16]  = 'Diplomacy/Diplomats';
        tTh.pd25[16]= 64;
        tTh.p[17]  = 'Manufacturing Processes';
        tTh.pd25[17]= 131072;
        tTh.p[18]  = 'Mathematical Operations';
        tTh.pd25[18]= 8388608;
        tTh.p[19]  = 'Middle East';
        tTh.pd25[19]= 2048;
        tTh.p[20]  = 'Optics';
        tTh.pd25[20]= 32;
        tTh.p[21]  = 'Populations/Resources';
        tTh.pd25[21]= 4194304;
        tTh.p[22]  = 'Securities - Finance';
        tTh.pd25[22]= 4;
        tTh.p[23]  = 'Soldiers/Military Life';
        tTh.pd25[23]= 4096;
        tTh.p[24]  = 'South America';
        tTh.pd25[24]= 64;
        tTh.p[25]  = 'Space Exploration';
        tTh.pd25[25]= 512;
        tTh.p[26]  = 'Types of Aircraft';
        tTh.pd25[26]= 4096;
        tTh.pd25[27] = THEMASK;
}
////////////////////////////////////
function FOURInit()
{
        tF = new Object();
        tF.elementID = 2;
        tF.label = "Person";
        tF.self = "tF";
        tF.shown = 0;
        tF.size = 115;
        tF.size1 = 116;
```

7

```
tF.mask25 = THEMASK;
tF.mask50 = THEMASK;
tF.mask75 = THEMASK;
tF.mask100 = THEMASK;
tF.pd25 = new Array(tF.size1);
tF.freq = new Array(tF.size);
tF.p = new Array(tF.size);
tF.i = new Array(4);
for     (i=0; i<4; i++)
        tF.i[i] = tF.size;
tF.selPer = "Todd";
tF.p[0] = 'Bill Clinton';
tF.pd25[0] = 17345114;
tF.p[1] = 'Jiang Zemin';
tF.pd25[1] = 1884304;
tF.p[2] = 'Clinton';
tF.pd25[2] = 4472832;
tF.p[3] = 'Benjamin Gilman';
tF.pd25[3] = 557056;
tF.p[4] = 'Boris Yeltsin';
tF.pd25[4] = 516;
tF.p[5] = 'Madeleine Albright';
tF.pd25[5] = 524352;
tF.p[6] = 'Richard Shelby';
tF.pd25[6] = 294912;
tF.p[7] = 'Samuel Berger';
tF.pd25[7] = 262160;
tF.p[8] = 'Zhu Rongji';
tF.pd25[8] = 1048592;
tF.p[9] = 'Ann Luzzatto';
tF.pd25[9] = 262144;
tF.p[10] = 'Army Armed Police';
tF.pd25[10] = 1048576;
tF.p[11] = 'Arthur W. Zafiropoulo';
tF.pd25[11] = 131072;
tF.p[12] = 'Barings';
tF.pd25[12] = 2097152;
tF.p[13] = 'Benjamin A. Gilman';
tF.pd25[13] = 512;
tF.p[14] = 'Bernard Harguindeguy';
tF.pd25[14] = 1;
tF.p[15] = 'Bob Elrod';
tF.pd25[15] = 16777216;
tF.p[16] = 'Bush';
tF.pd25[16] = 16;
tF.p[17] = 'Cardoso';
tF.pd25[17] = 4194304;
tF.p[18] = 'Central Europe';
tF.pd25[18] = 16777216;
tF.p[19] = 'Chairman';
tF.pd25[19] = 1048576;
tF.p[20] = 'Christopher Dodd';
tF.pd25[20] = 32768;
tF.p[21] = 'Curt Weldon';
tF.pd25[21] = 4096;
tF.p[22] = 'Dani Rodrik';
tF.pd25[22] = 4;
tF.p[23] = 'David Marquand';
tF.pd25[23] = 4;
tF.p[24] = 'David Postman';
tF.pd25[24] = 128;
tF.p[25] = 'Delores F. Harrod';
tF.pd25[25] = 1048576;
tF.p[26] = 'Deng Xiaoping';
tF.pd25[26] = 1048576;
tF.p[27] = 'Director';
tF.pd25[27] = 32;
```

8

```
tF.p[28] = 'Edward Luttwak';
tF.pd25[28] = 4;
tF.p[29] = 'F-14s';
tF.pd25[29] = 16777216;
tF.p[30] = 'Federico Pea';
tF.pd25[30] = 131072;
tF.p[31] = 'Fernando Enrique';
tF.pd25[31] = 4194304;
tF.p[32] = 'Fernando Henrique Cardoso';
tF.pd25[32] = 64;
tF.p[33] = 'Frank H. Murkowski';
tF.pd25[33] = 32768;
tF.p[34] = 'Frank Wisner';
tF.pd25[34] = 512;
tF.p[35] = 'Gary Locke';
tF.pd25[35] = 128;
tF.p[36] = 'General';
tF.pd25[36] = 4194304;
tF.p[37] = 'George Brown';
tF.pd25[37] = 131072;
tF.p[38] = 'George Bush';
tF.pd25[38] = 131072;
tF.p[39] = 'George Soros';
tF.pd25[39] = 4;
tF.p[40] = 'George Tenet';
tF.pd25[40] = 2048;
tF.p[41] = 'Greg Mastel';
tF.pd25[41] = 128;
tF.p[42] = 'Helms';
tF.pd25[42] = 1048576;
tF.p[43] = 'Henry Kaufman';
tF.pd25[43] = 4;
tF.p[44] = 'Hoare Govett';
tF.pd25[44] = 2097152;
tF.p[45] = 'Hong Kong Convention';
tF.pd25[45] = 32;
tF.p[46] = 'Hong Kong Optical Fair';
tF.pd25[46] = 32;
tF.p[47] = 'J.P. Morgan';
tF.pd25[47] = 4;
tF.p[48] = 'Jacques Chirac';
tF.pd25[48] = 16;
tF.p[49] = 'James Capel';
tF.pd25[49] = 2097152;
tF.p[50] = 'James Drumgool';
tF.pd25[50] = 16777216;
tF.p[51] = 'James Przystup';
tF.pd25[51] = 16;
tF.p[52] = 'James Rubin';
tF.pd25[52] = 512;
tF.p[53] = 'James Tobin';
tF.pd25[53] = 4;
tF.p[54] = 'Janet Heininger';
tF.pd25[54] = 128;
tF.p[55] = 'Jeff Cronenworth';
tF.pd25[55] = 4096;
tF.p[56] = 'Jeffrey Garten';
tF.pd25[56] = 4;
tF.p[57] = 'Jesse Helms';
tF.pd25[57] = 262144;
tF.p[58] = 'Jiang';
tF.pd25[58] = 8192;
tF.p[59] = 'Joel Johnson';
tF.pd25[59] = 16777216;
tF.p[60] = 'John Dingell';
tF.pd25[60] = 131072;
tF.p[61] = 'John Gannon';
```

9

```
tF.pd25[61] = 2048;
tF.p[62] = 'John Griffith-Jones';
tF.pd25[62] = 2097152;
tF.p[63] = 'Khan Research Laboratories';
tF.pd25[63] = 262144;
tF.p[64] = 'Kissinger';
tF.pd25[64] = 4194304;
tF.p[65] = 'Koptev';
tF.pd25[65] = 512;
tF.p[66] = 'Kurt Campbell';
tF.pd25[66] = 1048576;
tF.p[67] = 'Li';
tF.pd25[67] = 16;
tF.p[68] = 'Li Peng';
tF.pd25[68] = 16;
tF.p[69] = 'McCain';
tF.pd25[69] = 1048576;
tF.p[70] = 'Michael Maibach';
tF.pd25[70] = 16;
tF.p[71] = 'Michael Sze';
tF.pd25[71] = 32;
tF.p[72] = 'Natalie Goldring';
tF.pd25[72] = 16777216;
tF.p[73] = 'New York Republican';
tF.pd25[73] = 512;
tF.p[74] = 'Nicholas Lardy';
tF.pd25[74] = 16;
tF.p[75] = 'Nigel Pain';
tF.pd25[75] = 2097152;
tF.p[76] = 'Nixon';
tF.pd25[76] = 16;
tF.p[77] = 'Nomura';
tF.pd25[77] = 4;
tF.p[78] = 'Orville Schell';
tF.pd25[78] = 16;
tF.p[79] = 'Paul Volcker';
tF.pd25[79] = 4;
tF.p[80] = 'Paul Wolfowitz';
tF.pd25[80] = 2048;
tF.p[81] = 'Pavel Felgenhauer';
tF.pd25[81] = 1024;
tF.p[82] = 'Peter Felstead';
tF.pd25[82] = 1024;
tF.p[83] = 'Philip Wong';
tF.pd25[83] = 32;
tF.p[84] = 'President';
tF.pd25[84] = 4194304;
tF.p[85] = 'Qian Qichen';
tF.pd25[85] = 524288;
tF.p[86] = 'R-Ala.';
tF.pd25[86] = 32768;
tF.p[87] = 'Rafael Caldera';
tF.pd25[87] = 64;
tF.p[88] = 'Reno';
tF.pd25[88] = 4194304;
tF.p[89] = 'Robb';
tF.pd25[89] = 1048576;
tF.p[90] = 'Robert Kagan';
tF.pd25[90] = 524288;
tF.p[91] = 'Robert Rubin';
tF.pd25[91] = 16;
tF.p[92] = 'Ron Klink';
tF.pd25[92] = 131072;
tF.p[93] = 'Ronald Reagan';
tF.pd25[93] = 524288;
tF.p[94] = 'Saddam Hussein';
tF.pd25[94] = 2048;
```

10

```
        tF.p[95] = 'Samuel Montagu';
        tF.pd25[95] = 2097152;
        tF.p[96] = 'Stanley Roth';
        tF.pd25[96] = 1048576;
        tF.p[97] = 'Stephen Roach';
        tF.pd25[97] = 4;
        tF.p[98] = 'Susan Shirk';
        tF.pd25[98] = 1048576;
        tF.p[99] = 'Tim Neale';
        tF.pd25[99] = 128;
        tF.p[100] = 'Tim Roemer';
        tF.pd25[100] = 131072;
        tF.p[101] = 'Tom Cardamone';
        tF.pd25[101] = 16777216;
        tF.p[102] = 'Tom Mick';
        tF.pd25[102] = 128;
        tF.p[103] = 'Tony Chow';
        tF.pd25[103] = 32;
        tF.p[104] = 'Vice-Chairman';
        tF.pd25[104] = 32;
        tF.p[105] = 'Victor Kiam';
        tF.pd25[105] = 1048576;
        tF.p[106] = 'Warren Buffett';
        tF.pd25[106] = 4;
        tF.p[107] = 'William A. Reinsch';
        tF.pd25[107] = 131072;
        tF.p[108] = 'William Daley';
        tF.pd25[108] = 16;
        tF.p[109] = 'Wolfgang Demisch';
        tF.pd25[109] = 4096;
        tF.p[110] = 'Wu';
        tF.pd25[110] = 8;
        tF.p[111] = 'Xu Dengying';
        tF.pd25[111] = 16;
        tF.p[112] = 'of';
        tF.pd25[112] = 32;
        tF.p[113] = 'of Defense';
        tF.pd25[113] = 1048576;
        tF.p[114] = 'of Energy Federico Pena';
        tF.pd25[114] = 64;
        tF.pd25[115]= THEMASK;
}
////////////////////////////////
function FIVEInit()
{
        tFI = new Object();
        tFI.elementID = 1;
        tFI.label = "Government (general)";
        tFI.self = "tFI";
        tFI.shown = 0;
        tFI.size = 23;
        tFI.size1 = 24;
        tFI.mask25 = THEMASK;
        tFI.mask50 = THEMASK;
        tFI.mask75 = THEMASK;
        tFI.mask100 = THEMASK;
        tFI.pd25 = new Array(tFI.size1);
        tFI.freq = new Array(tFI.size);
        tFI.p = new Array(tFI.size);
        tFI.i = new Array(4);
        for     (i=0; i<4; i++)
                tFI.i[i] = tFI.size;
        tFI.selPer = "Todd";
        tFI.p[0] = 'U.S. Embassy';
        tFI.pd25[0] = 9502720;
        tFI.p[1] = 'House International Relations Committee';
        tFI.pd25[1] = 524800;
```

11

```
        tFI.p[2] = 'Air Force';
        tFI.pd25[2] = 4096;
        tFI.p[3] = 'British American Security Information Council';
        tFI.pd25[3] = 16777216;
        tFI.p[4] = 'Bureau of East Asian';
        tFI.pd25[4] = 1048576;
        tFI.p[5] = 'Chinese Army';
        tFI.pd25[5] = 1048576;
        tFI.p[6] = 'Defense Advanced Research Projects Agency';
        tFI.pd25[6] = 131072;
        tFI.p[7] = 'Foreign Relations Committee of';
        tFI.pd25[7] = 1048576;
        tFI.p[8] = 'General Logistic Department';
        tFI.pd25[8] = 1048576;
        tFI.p[9] = 'General Logistics Department';
        tFI.pd25[9] = 1048576;
        tFI.p[10] = 'General Political Department';
        tFI.pd25[10] = 1048576;
        tFI.p[11] = 'General Staff Department';
        tFI.pd25[11] = 1048576;
        tFI.p[12] = 'Hong Kong Trade Development Council';
        tFI.pd25[12] = 32;
        tFI.p[13] = 'International Relations Committee';
        tFI.pd25[13] = 32768;
        tFI.p[14] = 'Joint Program Office for Biological Defense';
        tFI.pd25[14] = 2048;
        tFI.p[15] = 'Liberation Army';
        tFI.pd25[15] = 1048576;
        tFI.p[16] = 'National Intelligence Council';
        tFI.pd25[16] = 2048;
        tFI.p[17] = 'Office of Naval Intelligence';
        tFI.pd25[17] = 262144;
        tFI.p[18] = 'Russian Space Agency';
        tFI.pd25[18] = 512;
        tFI.p[19] = 'Superior Court';
        tFI.pd25[19] = 4194304;
        tFI.p[20] = 'Telecommunications Commission';
        tFI.pd25[20] = 65536;
        tFI.p[21] = 'U.S. Commerce Department';
        tFI.pd25[21] = 128;
        tFI.p[22] = 'Washington Wheat Commission';
        tFI.pd25[22] = 128;
        tFI.pd25[23]= THEMASK;
}
/////////////////////////////////////
function SIXInit()
{
        tS = new Object();
        tS.elementID = 0;
        tS.label = "Company";
        tS.self = "tS";
        tS.shown = 0;
        tS.size = 53;
        tS.size1 = 54;
        tS.mask25 = THEMASK;
        tS.mask50 = THEMASK;
        tS.mask75 = THEMASK;
        tS.mask100 = THEMASK;
        tS.pd25 = new Array(tS.size1);
        tS.freq = new Array(tS.size);
        tS.p = new Array(tS.size);
        tS.i = new Array(4);
        for     (i=0; i<4; i++)
                tS.i[i] = tS.size;

tS.selPer = "Todd";
        tS.p[0] = 'Boeing';
```

12

```
tS.pd25[0] = 17842320;
tS.p[1] = 'Digital Equipment';
tS.pd25[1] = 8454152;
tS.p[2] = 'Intel';
tS.pd25[2] = 131096;
tS.p[3] = 'Airbus Industrie';
tS.pd25[3] = 144;
tS.p[4] = 'Amphenol';
tS.pd25[4] = 8388608;
tS.p[5] = 'General Motors';
tS.pd25[5] = 132;
tS.p[6] = 'Lockheed Martin';
tS.pd25[6] = 16781312;
tS.p[7] = 'Molex';
tS.pd25[7] = 8388608;
tS.p[8] = 'Sun Microsystems';
tS.pd25[8] = 136;
tS.p[9] = '3M Canada';
tS.pd25[9] = 8388608;
tS.p[10] = 'AMP';
tS.pd25[10] = 8388608;
tS.p[11] = 'BAA';
tS.pd25[11] = 2097152;
tS.p[12] = 'Bankers TRUST';
tS.pd25[12] = 4096;
tS.p[13] = 'Bell Helicopter Textron';
tS.pd25[13] = 16777216;
tS.p[14] = 'BellSouth';
tS.pd25[14] = 1048576;
tS.p[15] = 'Berg Electronics';
tS.pd25[15] = 8388608;
tS.p[16] = 'Berg Electronics LTD';
tS.pd25[16] = 8388608;
tS.p[17] = 'British Aerospace PLC';
tS.pd25[17] = 2097152;
tS.p[18] = 'British Telecommunications PLC';
tS.pd25[18] = 2097152;
tS.p[19] = 'Canon';
tS.pd25[19] = 131072;
tS.p[20] = 'China Aviation Supplies';
tS.pd25[20] = 16;
tS.p[21] = 'Clearnet PCS';
tS.pd25[21] = 65536;
tS.p[22] = 'Clinton AMD';
tS.pd25[22] = 131072;
tS.p[23] = 'Deutsche BANK';
tS.pd25[23] = 4;
tS.p[24] = 'Digital Creations';
tS.pd25[24] = 1048576;
tS.p[25] = 'Extreme Ultraviolet Limited Liability';
tS.pd25[25] = 131072;
tS.p[26] = 'Foreign Commercial Services';
tS.pd25[26] = 1048576;
tS.p[27] = 'Framatome Connectors';
tS.pd25[27] = 8388608;
tS.p[28] = 'General Electric';
tS.pd25[28] = 524288;
tS.p[29] = 'Grumman';
tS.pd25[29] = 4096;
tS.p[30] = 'Lansing Technology';
tS.pd25[30] = 1048576;
tS.p[31] = 'Matsushita Electric Industrial';
tS.pd25[31] = 2097152;
tS.p[32] = 'Mitsubishi Electronics America';
tS.pd25[32] = 4;
tS.p[33] = 'Mobility Canada LTD';
tS.pd25[33] = 65536;
```

13

```
        tS.p[34]    = 'Motorola';
        tS.pd25[34] = 65536;
        tS.p[35]    = 'NPO Trud';
        tS.pd25[35] = 512;
        tS.p[36]    = 'National Institute of Economic and Social Research';
        tS.pd25[36] = 2097152;
        tS.p[37]    = 'Newbridge Networks';
        tS.pd25[37] = 8388608;
        tS.p[38]    = 'Personal Communications Services';
        tS.pd25[38] = 65536;
        tS.p[39]    = 'Poly Technologies';
        tS.pd25[39] = 1048576;
        tS.p[40]    = 'RSA Data Security ,';
        tS.pd25[40] = 1;
        tS.p[41]    = 'Raytheon';
        tS.pd25[41] = 16777216;
        tS.p[42]    = 'Roger Cantel Mobile';
        tS.pd25[42] = 65536;
        tS.p[43]    = 'Rogers Cantel Mobile';
        tS.pd25[43] = 65536;
        tS.p[44]    = 'S/MIME Live!';
        tS.pd25[44] = 1;
        tS.p[45]    = 'Salomon BROS';
        tS.pd25[45] = 8;
        tS.p[46]    = 'Samsung Electronics Company LTD';
        tS.pd25[46] = 2097152;
        tS.p[47]    = 'Shaw Mobilecomm';
        tS.pd25[47] = 65536;
        tS.p[48]    = 'Sony';
        tS.pd25[48] = 2097152;
        tS.p[49]    = 'Sun Microsystems Computer';
        tS.pd25[49] = 8;
        tS.p[50]    = 'Toshiba';
        tS.pd25[50] = 2097152;
        tS.p[51]    = 'Underwriters LTD';
        tS.pd25[51] = 8388608;
        tS.p[52]    = 'Worldtalk';
        tS.pd25[52] = 1;
        tS.pd25[53] = THEMASK;
}
/////////////////////////////////
function     CalcFreqs(inObject)
{
        inObject.shown = 0;
        for     (i=0; i<inObject.size; i++)
        {
                inObject.freq[i] = 0;

x = inObject.pd25[i] & theMask25;
                if      (x != 0)
                {
                        l = (top.theQs[top.theQuery].numDocs > 25) ? 25 :
top.theQs[top.theQuery].numDocs;
                        for     (j=0; j<l; j++)
                        {
                                inObject.freq[i] += x & 0x1;
                                x = x >>> 1;
                        }
                }
                if      (top.theQs[top.theQuery].numDocs > 25)
                {
                        x = inObject.pd50[i] & theMask50;
                        if      (x != 0)
                        {
                                l = (top.theQs[top.theQuery].numDocs > 50)
? 50 : top.theQs[top.theQuery].numDocs;
                                        for     (j=25; j<l; j++)
```

```
                                    14
                                {
                                        inObject.freq[i] += x & 0x1;
                                        x = x >>> 1;
                                }
                        }
                }
                if      (top.theQs[top.theQuery].numDocs > 50)
                {
                        x = inObject.pd75[i] & theMask75;
                        if      (x != 0)
                        {
                                l = (top.theQs[top.theQuery].numDocs > 75)
 ? 75 : top.theQs[top.theQuery].numDocs;
                                for     (j=50; j<l; j++)
                                {
                                        inObject.freq[i] += x & 0x1;
                                        x = x >>> 1;
                                }
                        }
                }
                if      (top.theQs[top.theQuery].numDocs > 75)
                {
                        x = inObject.pd100[i] & theMask100;
                        if      (x != 0)
                        {
                                for     (j=75;
 j<top.theQs[top.theQuery].numDocs; j++)
                                {
                                        inObject.freq[i] += x & 0x1;
                                        x = x >>> 1;
                                }
                        }
                }
                if      (inObject.freq[i] > 0)
                        inObject.shown++;
        }
}
////////////////////////////////////
function        CalcMask(inObject)
{
        inObject.mask25 = inObject.pd25[inObject.i[0]] &
inObject.pd25[inObject.i[1]] &
                                        inObject.pd25[inObject.i[2]] &
inObject.pd25[inObject.i[3]];
        if      (top.theQs[top.theQuery].numDocs > 25)
                inObject.mask50 = inObject.pd50[inObject.i[0]] &
inObject.pd50[inObject.i[1]] & inObject.pd50[inObject.i[2]] & inObject.pd50[inObject.i[3]];
        if      (top.theQs[top.theQuery].numDocs > 50)
                inObject.mask75 = inObject.pd75[inObject.i[0]] &
inObject.pd75[inObject.i[1]] & inObject.pd75[inObject.i[2]] & inObject.pd75[inObject.i[3]];
        if      (top.theQs[top.theQuery].numDocs > 75)
                inObject.mask100 = inObject.pd100[inObject.i[0]] &
inObject.pd100[inObject.i[1]] & inObject.pd100[inObject.i[2]] & inObject.pd100[inObject.i[3]];

theMask25 = THEMASK;
        theMask50 = THEMASK;
        theMask75 = THEMASK;
        theMask100 = THEMASK;

if      (typeof t0 != "undefined")
        {
```

15

```
                theMask25 = theMask25 & tO.mask25;
                theMask50 = theMask50 & tO.mask50;
                theMask75 = theMask75 & tO.mask75;
                theMask100 = theMask100 & tO.mask100;
        } if      (typeof tT != "undefined")
        {
                theMask25 = theMask25 & tT.mask25;
                theMask50 = theMask50 & tT.mask50;
                theMask75 = theMask75 & tT.mask75;
                theMask100 = theMask100 & tT.mask100;
        } if      (typeof tTh != "undefined")
        {
                theMask25 = theMask25 & tTh.mask25;
                theMask50 = theMask50 & tTh.mask50;
                theMask75 = theMask75 & tTh.mask75;
                theMask100 = theMask100 & tTh.mask100;
        } if      (typeof tF != "undefined")
        {
                theMask25 = theMask25 & tF.mask25;
                theMask50 = theMask50 & tF.mask50;
                theMask75 = theMask75 & tF.mask75;
                theMask100 = theMask100 & tF.mask100;
        } if      (typeof tFI != "undefined")
        {
                theMask25 = theMask25 & tFI.mask25;
                theMask50 = theMask50 & tFI.mask50;
                theMask75 = theMask75 & tFI.mask75;
                theMask100 = theMask100 & tFI.mask100;
        } if      (typeof tS != "undefined")
        {
                theMask25 = theMask25 & tS.mask25;
                theMask50 = theMask50 & tS.mask50;
                theMask75 = theMask75 & tS.mask75;
                theMask100 = theMask100 & tS.mask100;
        }
}
//////////////////////////////////////
function doTheChange(ssss, n)
{
        if              (ssss == "tT")
                        inObject = tT;
        else if (ssss == "tO")
                        inObject = tO;
        else if (ssss == "tF")
                        inObject = tF;
        else if (ssss == "tS")
                        inObject = tS;
        else if (ssss == "tTh")
                        inObject = tTh;
        else    inObject = tFI;

for     (i=0; i<inObject.size; i++)
        {
                if      (n.indexOf(inObject.p[i]) != -1)
                {
                        iSelect = i;
                        break;
```

16

```
                }
        }
        if      (inObject.selPer.indexOf(n) != -1)
        {
                for     (i=0; i<4; i++)
                        if      (inObject.i[i] == iSelect)
                        {
                                inObject.i[i] = inObject.size;
                                break;
                        }
        }
        else    {
                if              (inObject.size == inObject.i[0])
                                inObject.i[0] = iSelect;
                else    if      (inObject.size == inObject.i[1])
                                inObject.i[1] = iSelect;
                else    if      (inObject.size == inObject.i[2])
                                inObject.i[2] = iSelect;
                else    if      (inObject.size == inObject.i[3])
                                inObject.i[3] = iSelect;
                else    {
                                alert("Sorry, you may only select four
items from any one list.");
                        }
        }

CalcMask(inObject);
        if      (navigator.appName == "Netscape")
        {
                if      (typeof tT != "undefined")
                        CalcAndDisplay(tT, true);
                if      (typeof tTh != "undefined")
                        CalcAndDisplay(tTh, true);
                if      (typeof tO != "undefined")
                        CalcAndDisplay(tO, true);
                if      (typeof tF != "undefined")
                        CalcAndDisplay(tF, true);
                if      (typeof tFI != "undefined")
                        CalcAndDisplay(tFI, true);
                if      (typeof tS != "undefined")
                        CalcAndDisplay(tS, true);

writeHeads();
        }
        else    {
                if      (typeof tO != "undefined")
                        ONE.location = "f.htm";
                if      (typeof tT != "undefined")
                        TWO.location = "f.htm";
                if      (typeof tTh != "undefined")
                        THREE.location = "f.htm";
                if      (typeof tF != "undefined")
                        FOUR.location = "f.htm";
                if      (typeof tFI != "undefined")
                        FIVE.location = "f.htm";
                if      (typeof tS != "undefined")
                        SIX.location = "f.htm";
                Head.location="h.htm";
        }
        return false;
}
/////////////////////////////////
function        CalcAndDisplay(inObject, yo)
{
        CalcFreqs(inObject);

inObject.w.document.open();
```

17

```
        inObject.w.document.writeln("<HTML><BODY BGCOLOR='#ffcc99'
BACKGROUND='images/bg.gif' LINK='0x000000' VLINK='0x000000'>");

if      (inObject.shown == inObject.size)
                inObject.w.document.writeln("<FONT SIZE=2><CENTER><B>" +
inObject.label + " (" + inObject.size + ") </CENTER><HR WIDTH='75%'
SIZE=1>");
        else    {
                inObject.w.document.writeln("<FONT SIZE=2><CENTER><B>" +
inObject.label + " (" + inObject.shown + "/" + inObject.size + ")
</CENTER><HR WIDTH='75%' SIZE=1>");
        } inObject.selPer = "Todd";
        for     (i=0; i<inObject.size; i++)
        {
                if      (inObject.freq[i] > 0)
                {
                        if      (i == inObject.i[0] || i == inObject.i[1]
|| i == inObject.i[2] || i == inObject.i[3])
                        {
                                inObject.w.document.writeln("<TABLE
BORDER=0 CELLPADDING=0 CELLSPACING=0><TR><TD>");
                                inObject.w.document.writeln("<A
HREF=\"f.htm?" + inObject.self + "," + inObject.p[i] + "\"");
inObject.w.document.write("onMouseOver='top.doMessage(3);return true;'
onClick=\"parent.doTheChange('");
                                inObject.w.document.write(inObject.self);
                                inObject.w.document.writeln("', '" +
inObject.p[i] + "');return false;\">");
                                inObject.w.document.writeln("<IMG ALIGN=TOP
HSPACE=4 VSPACE=2 BORDER=0 SRC='images/check.gif'></A></TD><TD><B><FONT
SIZE=2>");
                                k = inObject.freq[i]/2;
                                inObject.w.document.write("<NOBR><IMG
SRC='images/redlinea.gif' VSPACE=1>");
                                for     (j=0; j<k; j++)
                                        inObject.w.document.write("<IMG
SRC='images/redline.gif' VSPACE=1>");
                                inObject.w.document.write("<IMG
SRC='images/redlinez.gif' VSPACE=1></NOBR>");
                                if      (k>0)
inObject.w.document.writeln("<BR>");

inObject.w.document.writeln("<NOBR><A
HREF=\"f.htm?" + inObject.self + "," + inObject.p[i] + "\"");
inObject.w.document.write("onMouseOver='top.doMessage(3);return true;'
onClick=\"parent.doTheChange('");
                                inObject.w.document.write(inObject.self);
                                inObject.w.document.writeln("', '" +
inObject.p[i] + "');return false;\">");
                                inObject.w.document.writeln("<FONT
COLOR='black'>" + inObject.p[i] + " (" + inObject.freq[i] +
")</FONT></A></NOBR></TD></TR></TABLE>");

inObject.selPer = inObject.selPer + "," +
inObject.p[i];
                        }
                }
        } for     (i=0; i<inObject.size; i++)
        {
                if      (inObject.freq[i] > 0)
```

18

```
                {
                        if      (i == inObject.i[0] || i == inObject.i[1]
|| i == inObject.i[2] || i == inObject.i[3])
                                i = i;
                        else    {
                                inObject.w.document.writeln("<TABLE
BORDER=0 CELLPADDING=0 CELLSPACING=0><TR><TD>");
                                inObject.w.document.writeln("<A
HREF=\"f.htm?" + inObject.self + "," + inObject.p[i] + "\"");

inObject.w.document.write("onMouseOver='top.doMessage(4);return true;'
onClick=\"parent.doTheChange('");
                                inObject.w.document.write(inObject.self);
                                inObject.w.document.writeln("', '" +
inObject.p[i] + "');return false;\">");
                                inObject.w.document.writeln("<IMG ALIGN=TOP
HSPACE=4 VSPACE=2 BORDER=0 SRC='images/uncheck.gif'></A>");

inObject.w.document.writeln("</TD><TD><B><FONT SIZE=2>");

k = inObject.freq[i]/2;
                                inObject.w.document.write("<NOBR><IMG
SRC='images/redlinea.gif' VSPACE=1>");
                                for     (j=0; j<k; j++)
                                        inObject.w.document.write("<IMG
SRC='images/redline.gif' VSPACE=1>");
                                inObject.w.document.write("<IMG
SRC='images/redlinez.gif' VSPACE=1></NOBR>");
                                if      (k>0)

inObject.w.document.writeln("<BR>");

inObject.w.document.writeln("<NOBR><A
HREF=\"f.htm?" + inObject.self + "," + inObject.p[i] + "\"");

inObject.w.document.write("onMouseOver='top.doMessage(4);return true;'
onClick=\"parent.doTheChange('");
                                inObject.w.document.write(inObject.self);
                                inObject.w.document.writeln("', '" +
inObject.p[i] + "');return false;\">");
                                inObject.w.document.writeln(inObject.p[i] +
" (" + inObject.freq[i] + ")</A></NOBR></TD></TR></TABLE>");
                        }
                } inObject.w.document.writeln("</BODY></HTML>");
        inObject.w.document.close();
}
/////////////////////////////////////
function        writeObject(who, what)
{
        var inObject;

if      (who.name == "TWO")
        {
                if      (tT == null)
                        TWOInit();
                tT.w = who;
                inObject = tT;
        }
        else if (who.name == "ONE")     {
                if      (tO == null)
                        ONEInit();
                tO.w = who;
                inObject = tO;
        }
```

19
```
        else if (who.name == "SIX")    {
                if      (tS == null)
                        SIXInit();
                tS.w = who;
                inObject = tS;
        }
        else if (who.name == "FOUR")   {
                if      (tF == null)
                        FOURInit();
                tF.w = who;
                inObject = tF;
        }
        else if (who.name == "THREE")  {
                if      (tTh == null)
                        THREEInit();
                tTh.w = who;
                inObject = tTh;
        }
        else    {
                if      (tFI == null)
                        FIVEInit();
                tFI.w = who;
                inObject = tFI;

}
        CalcAndDisplay(inObject, false);
}
//////////////////////////////////////
function doLoad()
{
        if      (top.theQuery < 0)
                        parent.location = "hotsite.html";
        else    parent.margin.location = 'margin_v.htm?Organization
(general) (24)+Country (49)+Subject Areas (27)+Person (115)+Government
(general) (23)+Company (53)';

if              (navigator.appName == 'Netscape')

top.tabs.document.images[0].src="images/sm_vis.gif";
        else    top.tabs.location="tabs.htm?visual";
}
</SCRIPT>
</HEAD>
<FRAMESET ROWS ="*,*,25%" BORDER=1 FRAMEBORDER=1
onLoad="doLoad();"><FRAMESET COLS="*,*" BORDER=1 FRAMEBORDER=1><FRAME
SRC="f.htm" NAME="ONE" SCROLLING=AUTO><FRAME SRC="f.htm" NAME="TWO"
SCROLLING=AUTO></FRAMESET><FRAMESET COLS="*,*" BORDER=1
FRAMEBORDER=1><FRAME SRC="f.htm" NAME="THREE" SCROLLING=AUTO><FRAME
SRC="f.htm" NAME="FOUR" SCROLLING=AUTO></FRAMESET><FRAME SRC="h.htm"
NAME="Head" SCROLLING=AUTO BORDER=1 FRAMEBORDER=1></FRAMESET>
```

Appendix B

1

```
<BASE HREF="file:///C|/My Documents/Viz-patent/f.htm">

<!DOCTYPE HTML PUBLIC "-//W3C//DTD HTML 3.2 Final//EN">
<HTML>
<BODY onLoad="parent.writeObject(self, (location.search).substring(1))">
</BODY>
</HTML>
```

Appendix C

1

```
<BASE HREF="file:///C|/My Documents/Viz-patent/h.htm">

<!DOCTYPE HTML PUBLIC "-//W3C//DTD HTML 3.2 Final//EN">
<HTML>
<BODY onLoad="parent.Headlines(self)">
</BODY>
</HTML>
```

Appendix D

```
<BASE HREF="file:///C|/My Documents/Viz-patent/hotsite.html">

<HTML>
<HEAD>
<TITLE>The AFCEA Information Alert</TITLE>
<SCRIPT>
/////////////////////
var theNumQueries = 5;   // Number of queries in today's hotsite
var     theNumDocs = 25;   // Maximum number of documents in a query
var     theQuery = -2;   // The active query index. Starts off with no
active query
var     theQs;                             // Global variable that holds the
query information.
var theQueryString = "There is no query selected. You must click on a query
in the Queries Tab.";
var THEMASK = 0xffffffff;
var     theVsize;
////////////////////////////////////
function       doMessage(i, s)
{
        if     (i == 1)
               window.status = "Click here to view the document summary.";

if     (i == 2)
               window.status = "Click here to view the full document.";

if     (i == 3)
               window.status = "Click here to deselect this term.";

if     (i == 4)
               window.status = "Click here to select this term.";

if     (i == 5)
               window.status = "Click here to change the categories
displayed.";

if     (i == 6)
               window.status = "Click here to select " + s + ".";

if     (i == 7)
               window.status = "Click here to view the results of this
query.";
}
/////////////////////
function WriteQuery()
{
        top.margin.document.writeln("<TABLE BGCOLOR='#ccffcc' BORDER=0
CELLSPACING=0 CELLPADDING=0>");
        top.margin.document.writeln("<TR> <TD WIDTH=5> </TD> <TD
VALIGN=TOP WIDTH=132>");
        top.margin.document.write("<B><I>Query:</I></B><FONT SIZE=2>");
        top.margin.document.write(top.theQueryString);
        top.margin.document.writeln("</TD>");
        top.margin.document.write("<TD WIDTH=8><IMG
SRC='images/tab_gr_r.gif' WIDTH=8 HEIGHT=");
        top.margin.document.write(28 + 0.725 *
(top.theQueryString).length);
        top.margin.document.writeln(" WIDTH=8></TD>");
        top.margin.document.writeln("</TR> <TR><TD COLSPAN=3 WIDTH=145
HEIGHT=10><IMG SRC='images/tab_gr_b.gif' WIDTH=145 HEIGHT=10></TD></TR>
</TABLE>");
}
/////////////////////
function InitQueries()
{
               theVsize = new Array(theNumQueries);
```

```
                                2
                    theVsize[0] = 33713;
                    theVsize[1] = 31234;
                    theVsize[2] = 28882;
                    theVsize[3] = 30986;
                    theVsize[4] = 26919;

theQs = new Array(theNumQueries);

for     (i=0; i<theNumQueries; i++)
                    {
                            theQs[i] = new Object();
                            theQs[i].text = "There is no query selected.";
                            theQs[i].docs = new Array(theNumDocs);
                            theQs[i].numDocs = 0;
                            theQs[i].mask25 = THEMASK;
                            theQs[i].mask50 = THEMASK;
                            theQs[i].mask75 = THEMASK;
                            theQs[i].mask100 = THEMASK;
                            theQs[i].checkIndex = -1;
                            theQs[i].theSelectedIndex = -1;

theQs[i].subjectName = "";

for     (j=0; j<theNumDocs; j++)
                                    theQs[i].docs[j] = new Object();
                    }
}
////////////
function DocWin(q, i, df)
{
        if      (df == true)
        {
                w = window.open(theQs[q].docs[i].full,
                                                "DocView",
"scrollbars,status=no,toolbar=no,location=no,directories=no,menubar=no,widt
h=600,height=450");
                theQs[q].docs[i].docFlag = true;
        }
        else    {
                w = window.open(theQs[q].docs[i].sum,
                                                "DocView",
"scrollbars,status=no,toolbar=no,location=no,directories=no,menubar=no,widt
h=600,height=450");
                theQs[q].docs[i].sumFlag = true;
        }
        if      (navigator.appName == "Netscape")
                w.focus();
}
////////////
function DocClick(q, df, docIndex)
{
        if              (df == true)
                        theQs[q].docs[docIndex].docFlag = true;
        else    theQs[q].docs[docIndex].sumFlag = true;

if              (navigator.appName == "Netscape")
                        tabs.document.images[0].src="images/sm_docs.gif";
        else    tabs.location="tabs.htm?docs";
        top.margin.location = "margin_d.htm";
}
////////////
</SCRIPT>
</HEAD>
<FRAMESET COLS="170,*" onLoad="InitQueries();" BORDER=0 FRAMEBORDER=0
MARGINWIDTH=0 MARGINHEIGHT=0><FRAMESET ROWS="50,*"><FRAME NAME="home"
```

3

```
SRC="home.htm" SCROLLING=NO MARGINWIDTH=0 MARGINHEIGHT=0><FRAME
NAME="margin" SRC="margin.htm" SCROLLING=AUTO MARGINWIDTH=0
MARGINHEIGHT=0></FRAMESET><FRAMESET ROWS="50,*"><FRAME NAME="tabs"
SRC="tabs.htm" SCROLLING=NO MARGINWIDTH=0 MARGINHEIGHT=0><FRAME
NAME="content" SRC="queries.htm" SCROLLING=AUTO MARGINWIDTH=0
MARGINHEIGHT=0 BORDER=1 FRAMEBORDER=1></FRAMESET></FRAMESET>
```

Appendix E

```
<BASE HREF="file:///C|/My Documents/Viz-patent/margin_v.htm">

<HTML>
<HEAD>
<SCRIPT>
var     theViewWindow = "";

function        changeVisMode()
{
        s = "view.html" + location.search;
        if              (theViewWindow == "" || theViewWindow.closed)
                        theViewWindow = window.open(s, "ChangeView",
"width=400,height=400,status=yes");
        else    {
                        if      (navigator.appName == "Netscape")
                                theViewWindow.focus();
        }
}
function doLoad()
{
        top.defaultStatus = "Visualizer loaded.";
}
</SCRIPT>
</HEAD>
<BODY BGCOLOR="#ffffcc" BACKGROUND="images/bg.gif" onLoad = "doLoad();">
<CENTER>
<BR>
<P>
<TABLE BGCOLOR='#ccffcc' BORDER=0 CELLSPACING=0 CELLPADDING=0>
<TR> <TD WIDTH=5> </TD> <TD VALIGN=TOP WIDTH=132>
<B><I>Query:</I></B><FONT SIZE=2> I would like information about factors
affecting technology exports including controls, restraints or sanctions.
                </TD>
<TD WIDTH=8><IMG SRC='images/tab_gr_r.gif' WIDTH=8 HEIGHT=122.975
WIDTH=8></TD>
</TR> <TR><TD COLSPAN=3 WIDTH=145 HEIGHT=10><IMG SRC='images/tab_gr_b.gif'
WIDTH=145 HEIGHT=10></TD></TR> </TABLE>
<P><TABLE BGCOLOR="#ccccff" BORDER=0 CELLSPACING=0 CELLPADDING=0>
<TR><TD WIDTH=5> </TD><TD VALIGN=TOP
WIDTH=132><B><I>Configure:</I></B><CENTER><P>
<A HREF="margin_v.htm" onMouseOver = "top.doMessage(5);return true;"
onClick="changeVisMode();return false;">Change View</A>
</TD><TD><IMG SRC="images/tab_bl_r.gif" HEIGHT=90 WIDTH=8></TD></TR>
<TR><TD COLSPAN=3 WIDTH=145><IMG
SRC="images/tab_bl_b.gif"></TD></TR></TABLE>

<P>
<TABLE BGCOLOR="#ffffcc" BORDER=0 CELLSPACING=0 CELLPADDING=0>
<TR>
<TD WIDTH=5> </TD>
<TD VALIGN=TOP WIDTH=132>
<B><I>Tips:</I></B><FONT SIZE=2>
This folder categorizes document information by topic.
<P>The topic categories displayed are based on the results of the selected
query.
<P>The total number of topics for each category appears next to the
category title.
<P>Narrow the query results by <B>selecting</B> up to four topics in each
category.
<P>As you select topics, each category changes to indicate only the topics
that
appear in the documents that match the current selection.
<P>The headline list also changes to indicate the documents that match.
<P><B>Select a Summary (Sum) icon</B> to view a summary of a document.
<P><B>Click on a Document (Full) icon</B> to view all the text in a
document.
<P><B>Click on Change View</B> in the blue note above to change the
```

2

```
categories displayed.
<HR><CENTER><B>Questions?</B> Send e-mail to: <A
HREF="mailto:info@mnis.net">info@mnis.net</A>.
<P><FONT SIZE=1>- 1997 <A HREF="http://www.mnis.net" TARGET=_top>
Manning & Napier Information Services.</A><BR>All rights reserved.</FONT>
</TD>
<TD><IMG SRC="images/tab_ye_r.gif" HEIGHT=790 WIDTH=8></TD>
</TR>
<TR><TD COLSPAN=3 WIDTH=145><IMG SRC="images/tab_ye_b.gif"></TD></TR>
</TABLE>
</BODY>
</HTML>
```

Appendix F

```
<BASE HREF="file:///C|/My Documents/Viz-patent/tabs.htm">

<HTML>
<HEAD>
<SCRIPT>
var     theRoot;
////////////
function getUrl()
{
        s = location.href;
        i = s.lastIndexOf("/");
        theRoot = s.substring(0, i+1);
}
////////////
function viz()
{
        top.defaultStatus = "Loading Visualizer...";
        top.theDate = new Date();

if              (top.theQuery < 0)
                        alert("You must select a query to use the
Visualizer.");
        else    top.content.location = theRoot + "visual" + top.theQuery +
".htm";
}
////////////
function fil()
{
        top.content.location = theRoot + "filter.htm";
}
////////////
function doc()
{
        if      (navigator.appName == "Netscape")
        {
                top.margin.location = "margin_d.htm";
                top.content.location = "document.htm";
                document.images[0].src = theRoot + 'images/sm_docs.gif';
        }
        else    {
                top.margin.location = "margin_d.htm";
                top.content.location = "document.htm";
                location = theRoot + "tabs.htm?docs";
        }
}
////////////
function        queries()
{
        parent.margin.location = theRoot + "margin.htm";
        top.content.location   = theRoot + "queries.htm";
}
////////////
function        results()
{
        top.content.location   = theRoot + "results.htm";
}
////////////
function        newquery()
{
        top.content.location   = theRoot + "new_qry.htm";
}
////////////
</SCRIPT>
</HEAD>
<BODY BACKGROUND="images/border.gif" onLoad = "getUrl();">
<MAP NAME="tabs">
<AREA COORDS="0,20,85,60" HREF="javascript:queries()">
```

2

```
<AREA COORDS="86,20,164,40" HREF="javascript:newquery()">
<AREA COORDS="165,20,240,40" HREF="javascript:results()">
<AREA COORDS="241,20,317,40" HREF="javascript:fil()">
<AREA COORDS="318,20,395,40" HREF="javascript:viz()">
<AREA COORDS="396,20,470,40" HREF="javascript:doc()">
</MAP>
<IMG SRC="images/sm_query.gif" border=0 ALIGN=TOP USEMAP="#tabs">

</BODY>
</HTML>
```

What is claimed is:

1. A method for analyzing and displaying thematic content of information contained in a plurality of documets in a computing system, said method comprising:

extracting one or more information units from a plurality of documents according to two or more instances of subject fields, including a first subject field and a second subject field, each information unit having a relationship to one or more of said subject fields;

displaying a plurality of panels, including a first panel and a second panel, each of said panels corresponding to each of said subject fields wherein said first panel comprises a visual representation of information units having a relationship with said fistr subject field and said second panel comprises a visual representation of information units having a relationship to said second subject field;

receiving an input, said input indicating a selection from one or more individual instances of filters;

applying individual instances of filters to the information units responsive to said input to produce a filtered set of information units; and re-displaying said plurality of panels, wherein each of said plurality of panels comprises revised visual representations of information units, wherein said revised visual representation exclusively includes only those information units in said filtered set of information units.

2. The method of claim 1 wherein said applying individual instances of filters further comprises:

selecting a particular subject field by clicking on a panel corresponding to said subject field.

3. The method of claim 1 wherein said subject field is determined by an automatically produced coding of the information objects within said plurality of documents.

4. The method of claim 1 wherein said subject field is determined by a manually produced coding of the information objects within said plurality of documents.

5. The method of claim 1 wherein said visual representation comprises a bar chart indicating the number of documents containing each of the information units.

6. The method of claim 1 further comprising repeatedly performing the receiving, applying and redisplaying to further filter the documents.

7. The method of claim 1 further comprising displaying a list of documents corresponding to the information units being displayed, said list being updated for each successive application of the receiving applying, and re-displaying steps.

8. The method of claim 1 wherein said receiving an input is accessible to a user by a tab or button on an HTML document displayed to the user.

9. The method of claim 1 wherein said plurality of panels may be selectably arranged on a display screen according to a user input.

10. The method of claim 7 further comprising providing a synoptic text of a user selected document in said list of displayed documents.

11. The method of claim 7 further comprising providing a full text of a user selected document in said list of displayed documents.

* * * * *